United States Patent [19]
Grell et al.

[11] 3,725,388
[45] Apr. 3, 1973

[54] N-ACYL-7-(N''-CYCLOALKYL-UREIDO-N'-SULFONYL)-ISOQUINOLINES AND -BENZAZEPINES AND ALKALI METAL SALTS THEREOF

[75] Inventors: Wolfgang Grell; Gerhart Griss; Manfred Kleemann; Eberhard Kutter, all of Biberach/Riss, Germany

[73] Assignee: Boehringer Ingelheim G. m. b. H., Ingelheim/Rhine, Germany

[22] Filed: June 25, 1970

[21] Appl. No.: 49,930

[52] U.S. Cl.....260/239 BB, 260/283 S, 260/283 SA, 260/286 R, 260/286 Q, 260/287 R, 260/288 R, 260/289 R, 424/244, 424/258
[51] Int. Cl. .......................C07d 35/42, C07d 41/08
[58] Field of Search...260/239 BB, 286 R, 286 Q, 287 R, 260/553 D, 326.12 R

[56] References Cited

UNITED STATES PATENTS

| | | | |
|---|---|---|---|
| 3,083,207 | 3/1963 | Hoehn et al. | 260/326.12 R |
| 3,409,644 | 11/1968 | Muller et al. | 260/553 D |

*Primary Examiner*—Alton D. Rollins
*Attorney*—Hammond & Littell

[57] ABSTRACT

Compounds of the formula

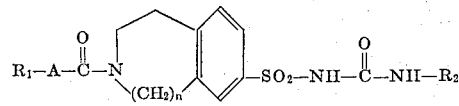

wherein
R$_1$ is straight or branched alkyl of one to four carbon atoms, phenyl, alkoxy of one to three carbon atoms — phenyl, tolyl, trifluoromethyl-phenyl, monohalo-phenyl, dihalo-phenyl, 2-methoxy-5-chlorophenyl, diphenyl, α-naphthyl, 1,2,3,4-tetrahydronaphthyl-(1), indanyl-(1) or benzoyl,
R$_2$ is n-butyl, cycloalkyl of five to eight carbon atoms, alkyl of one to two carbon atoms — cycloalkyl of five to eight carbon atoms, or adamantyl-(1),
A is a carbon-to-carbon bond, alkylene of one to five carbon atoms or phenyl-alkylene of one to five carbon atoms, and
n is 1 or 2,
as well as alkali metal and alkaline earth metal salts thereof; the compounds and their salts are useful as hypoglycemics in warm-blooded animals.

8 Claims, No Drawings

N-ACYL-7-(N''-CYCLOALKYL-UREIDO-N'-SULFONYL)-ISOQUINOLINES AND -BENZAZEPINES AND ALKALI METAL SALTS THEREOF

This invention relates to novel N-acyl-7-(N''-cycloalkyl-ureido-N'-sulfonyl)-isoquinolines and -benzazepines, as well as pharmaceutically acceptable alkali metal and alkaline earth metal salts thereof, and to a method of preparing these compounds.

More particularly, the present invention relates to a novel class of compounds of the formula

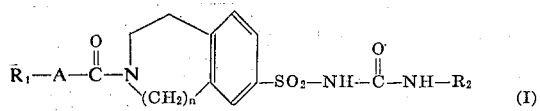

wherein
- $R_1$ is straight or branched alkyl of one to four carbon atoms, phenyl, alkoxy of one to three carbon atoms — phenyl, tolyl, trifluoromethyl-phenyl, monohalo-phenyl, dihalo-phenyl, 2-methoxy-5-chlorophenyl, diphenyl, α-naphthyl, 1,2,3,4-tetrahydronaphthyl-(1), indanyl-(1) or benzoyl,
- $R_2$ is n-butyl, cycloalkyl of five to eight carbon atoms, alkyl of one to two carbon atoms — cycloalkyl of five to eight carbon atoms, or adamantyl-(1),
- A is a carbon-to-carbon bond, alkylene of one to five carbon atoms or phenyl-alkylene of one to five carbon atoms, and
- n is 1 or 2, as well as non-toxic, pharmacologically acceptable alkali metal and alkaline earth metal salts thereof.

The compounds of the formula I above may be prepared by either of the following methods:

Method A

By reacting a sulfonamide of the formula

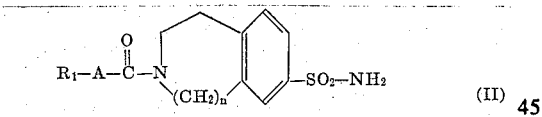

wherein $R_1$, A and n have the same meanings as in formula I, with an isocyanate of the formula $$O = C = N - R_2 \quad (III)$$

wherein $R_2$ has the same meanings as in formula I.

The reaction is carried out in the presence of an inert organic solvent and preferably in the presence of an inorganic or tertiary organic base, such as an alkali metal hydroxide or pyridine. Although the reaction will proceed, in principle, at room temperature, it is preferably performed at elevated temperatures, especially between 50° and 150°C., because the reaction time at room temperature is unduly long.

It is most advantageous to first form an alkali metal salt of the sulfonamide II by reacting the same with an ethanolic solution of an alkali metal hydroxide, evaporating the reaction solution to dryness, and then reacting the residue with the isocyanate III.

Method B

By reacting a sulfonyl-carbamic acid ester of the formula

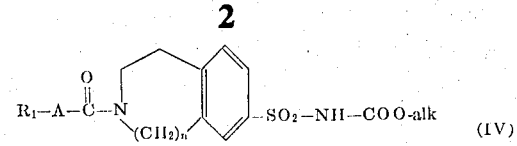

wherein $R_1$, A and n have the same meanings as in formula I and alk is lower alkyl, with a primary amine of the formula $$H_2N - R_2 \quad (V)$$

wherein $R_2$ has the same meanings as in formula I.

The reaction is carried out in the presence of an inert organic solvent at room temperature or elevated temperatures, preferably at a temperature between 50° and 120°C.

Examples of suitable inert organic solvents for use in Methods A and B are dimethylformamide, dimethylsulfoxide and nitrobenzene; these solvents exhibit the most advantageous solvent properties with respect to the starting materials.

If desired, a compound of the formula I obtained by method A or B may be converted into a non-toxic, pharmacologically acceptable alkali metal or alkaline earth metal salt thereof by conventional methods; for instance, by dissolving the free acid in a suitable inert solvent, such as ethanol, and adding thereto a solution of one equivalent of an alkali metal hydroxide or alkaline earth metal hydroxide. The sodium salts of the compounds of the formula I are particularly preferred.

The starting materials for methods A and B, i.e., the compounds of the formulas II and IV are also novel, but they may be prepared by methods involving known chemical principles.

Thus, a sulfonamide of the formula II may be prepared by reacting 1,2,3,4-tetrahydro-isoquinoline-7-sulfonamide or 2,3,4,5-tetrahydro-1H-3-benzazepine-7-sulfonamide, i.e., a compound of the formula

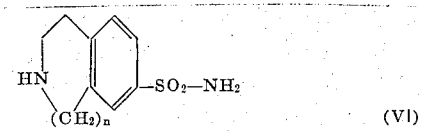

wherein n is 1 or 2, with an acyl halide of the formula

wherein R and A have the same meanings as in formula I and Hal is halogen, in the presence of a basic organic solvent, such as pyridine; or alternatively with a carboxylic acid of the formula

wherein $R_1$ and A have the same meanings as in formula I, in the presence of an activator, such as thionyl chloride or dicyclohexyl-carbodiimide.

Moreover, a compound of the formula II may also be prepared by reacting a sulfochloride of the formula

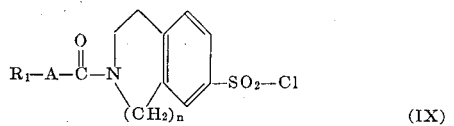

(IX)

wherein $R_1$, A and n have the same meanings as in formula I, with ammonia.

A sulfonyl-carbamic acid ester of the formula IV may be prepared by reacting a sulfonamide of the formula II with an alkyl chloroformate of the formula $$Cl - COO - alk \qquad (X)$$

wherein alk has the same meanings as in formula IV.

The compounds embraced by formula VI are not described in the literature and are therefore also novel. These sulfonamides may be prepared by chlorosulfonation of a compound of the formula

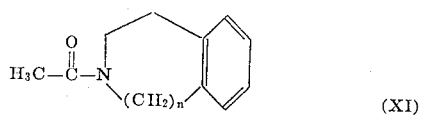

(XI)

wherein n is 1 or %;N reacting the reaction product with ammonia, and subsequently splitting off the acetyl group.

1,2,3,4-Tetrahydro-isoquinoline-7-sulfonamide, i.e., the compound of the formula VI wherein n is 1, may also be prepared from 2-acetyl-7-amino-1,2,3,4-isoquinoline, which is a known compound, by converting the amino group of the latter into the chlorosulfonyl group by means of a modified Sandmeyer Reaction [see H. Meerwein et al, Berichte 60, 841 (1957)], reacting the product with ammonia, and splitting off the 2-acetyl substituent with the aid of a dilute mineral acid.

Finally, the sulfochlorides embraced by formula IX, which are also new, may be prepared by replacing the 7-amino group of a compound of the formula

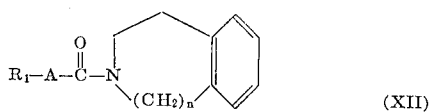

(XII)

wherein $R_1$, A and n have the same meanings as in formula I, by the chlorosulfonyl group by means of a modified Sandmeyer Reaction (see above); or also by chlorosulfonation of a compound of the formula

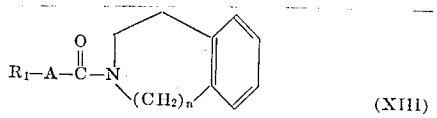

(XIII)

wherein $R_1$, A and n have the same meanings as in formula I, pursuant to known methods.

The following examples describe the preparation of the novel starting compounds.

EXAMPLE A 1,2,3,4-Tetrahydro-isoquinoline-7-sulfonamide hydrochloride a. A solution of 175.2 gm (1mol) of 2-acetyl-1,2,3,4-tetrahydro-isoquinoline in 80 ml of chloroform was added dropwise to 844 gm (7.24 mols) of chlorosulfonic acid, while exteriorly cooling the latter on an ice/salt bath to maintain the internal temperature at between 8° and 15°C. Thereafter, the reaction mixture was allowed to stand overnight at 20°C., and was then slowly poured over a large amount of ice. The aqueous mixture was extracted with chloroform, and the chloroform phase was dried, filtered and evaporated. 232 gm of raw 2-acetyl-1,2,3,4-tetrahydro-isoquinoline-7-sulfochloride, having a honey-like consistency, were obtained.

b. The raw sulfochloride thus obtained was made less viscous by heating it, and was then stirred into 600 ml of concentrated aqueous ammonia. The mixture was stirred and kneaded for one hour more, and then the colorless precipitate which had formed was separated by vacuum filtration, washed several times with water and once with acetone, and finally dried at 80°C. in a vacuum of 0.1 mm Hg. 172 gm of 2-acetyl-1,2,3,4-tetrahydroisoquinoline-7-sulfonamide, m. p. 220°–224 °C., of the formula

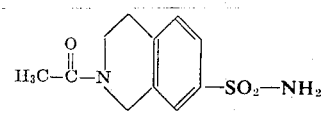

were obtained.

Analysis: $C_{11} H_{14} N_2 O_3 S$; mol. wt. 254.2

Calculated: C — 51.97%; H — 5.55%; N — 11.02%

Found: C — 52.40%; H — 5.79%; N — 10.58% c. A mixture of 172 gm of 2-acetyl-1,2,3,4-tetrahydro-isoquinoline-7-sulfonamide and 1.4 liters of semiconcentrated hydrochloric acid was refluxed for 3 hours. Toward the end, activated charcoal was added, and the mixture was filtered, while still hot, through a layer of infusorial earth. The filtrate was evaporated in vacuo until crystallization began, and then cooled. The crystalline precipitate was collected by vacuum filtration and dried, yielding 105 gm of 1,2,3,4-tetrahydro-isoquinoline-7-sulfonamide hydrochloride, m. p. 212°–217°C., of the formula

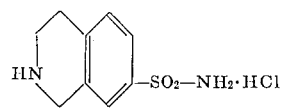

Analysis: $C_9 H_{13} Cl N_2 O_2 S$; mol. wt. 248.7

Calculated: C—43.50%; H—5.27%; N—11.24%

Found: C—43.30%; H—5.35%; N—10.89%

The free base had a melting point of 176°–180°C.

EXAMPLE B 1,2,3,4-Tetrahydro-isoquinoline-7-sulfonamide hydrochloride a. 7.61 gm (0.040 mol) of 2-acetyl-7-amino-1,2,3,4-tetrahydro-isoquinoline, m. p. 107°–108°C. [literature: m. p. 109°–111°C.; E. Ochiai and T. Nakagome, Chem. Pharm. Bull. (Japan) 6, 497 (1958)], were dissolved in 8.4 ml of concentrated hydrochloric acid and, at an internal temperature of no more than + 5°C., diazotized with a solution of 3.04 gm (0.044 mol) of $NaNO_2$ in 6 ml of water.

The resulting diazonium salt solution was admixed with 3.04 gm (0.032 mol) of anhydrous $MgCl_2$, the mixture was heated to 30°C. and it was quickly stirred into 40 ml of glacial acetic acid which had been saturated with $SO_2$ and contained 2.2 gm (0.0129 mol) of CuCl₂ · 2H₂O, also heated to 30°C. By exterior heating, the internal temperature of the reaction mixture was raised to 48°C., and it was stirred at that temperature for 25 minutes. After that time, the initially vigorous evolution of nitrogen is only very slight. The dark-brown reaction solution was diluted with 60 ml of water, and extracted with cold ether. The ethereal extract solution was washed with dilute aqueous sodium bicarbonate, then with an aqueous sodium carbonate solution having a pH of 8–9 and finally with water, dried over sodium sulfate, and evaporated to dryness in vacuo. 7.0 gm of raw 2-acetyl-1,2,3,4-tetrahydro-isoquinoline-7-sulfochloride, having a honey-like consistency, remained as a residue.

b. 30 ml of concentrated ammonia were poured over 6.2 gm (22.6 millimols) of the raw sulfochloride obtained in (a), and the mixture was kneaded for 1 hour on an ice bath. Thereafter, the resulting crystallizate was vacuum-filtered, and the filter cake was washed three times with water and then twice with acetone. 4.3 gm of 2-acetyl-1,2,3,4-tetrahydro-isoquinoline-7-sulfonamide, m.p. 223°–226°C, were obtained.

Analysis:C₁₁H₁₄N₂O₃S; mol. wt. 254.2
Calculated:C—51.97%;H—5.55%;N—11.02%
Found:C—52.10%;H—5.57%;N—10.70% c. A mixture of 4.0 gm of the sulfonamide obtained in (b) and 60 ml of aqueous 10% HCl was refluxed for 2.5 hours, toward the end in the presence of some activated charcoal. Thereafter, the reaction mixture was filtered through infusorial earth, and the filtrate was evaporated to dryness in vacuo. The residue was recrystallized from methanol, yielding 3.3 gm of 1,2,3,4-tetrahydro-isoquinoline-7-sulfonamide hydrochloride, m. p. 215°–218°C.

Analysis:C₉H₁₃Cl N₂O₂S; mol. wt. 248.7
Calculated:C—43.50%;M—5.27%;N—11.24%
Found:C—43.60%;H—5.41%;N—10.99%

EXAMPLE C 2-(3'-Phenyl-propionyl)-1,2,3,4-tetrahydro-isoquinoline-7-sulfonamide

Three hundred seventy-three gm (2.2 mols) of hydrocinnamic acid chloride were added dropwise to a suspension of 548 gm (2.2 mols) of 1,2,3,4-tetrahydro-isoquinoline-7-sulfonamide hydrochloride (m.p. 212°–217°C) in 4 liters of pyridine (distilled over BaO), while stirring and cooling the latter to prevent the internal temperature from rising above 15°C. Thereafter, the reaction mixture was stirred for 4 hours at 20°C, and then the pyridine was distilled off in vacuo. The slurry-like residue was stirred with 3 liters of water, vacuum-filtered, again stirred with 4 liters of water and again vacuum-filtered. The last filter cake was dried and recrystallized from a mixture of methanol and dimethylformamide (3:1), yielding 440 gm of 2-(3'-phenyl-propionyl)-1,2,3,4-tetrahydro-isoquinoline-7-sulfonamide, m.p. 218°–222°C, of the formula

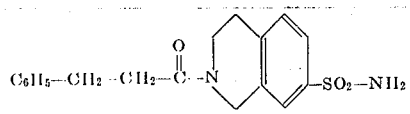

Analysis:C₁₈H₂₀N₂O₃S; mol. wt. 344.4
Calculated:C — 62.78%;H — 5.85%;N — 8.14%
Found:C — 63.00%;H — 5.80%;N — 8.16%

EXAMPLE D 2-(2'-Phenyl-propionyl)-1,2,3,4-tetrahdyro-isoquinoline-7-sulfonamide 13.1 gm (0.11 mol) of freshly distilled thionyl chloride were slowly added dropwise to a mixture of 15.0 gm (0.10 mol) of hydratropic acid, 24.9 gm (0.10 mol) of 1,2,3,4-tetrahydro-isoquinoline-7-sulfonamide hydrochloride (m.p. 212°–217°C) and 250 ml of pyridine (distilled over BaO), while maintaining the internal temperature of the mixture between 5° and 7°C. Thereafter, the reaction mixture was stirred overnight at 20°C, and then the pyridine was distilled off in vacuo. The greasy residue was stirred with water, the solid product formed thereby was collected by vacuum filtration, the filter cake was briefly boiled with ethylacetate, the mixture was allowed to cool, and the solid phase was separated by vacuum filtration, washed with ethylacetate, and dried at 80°C in a vacuum of 20 mm Hg. 19.2 gm of 2-(2'-phenyl-propionyl)-1,2,3,4-tetrahydro-isoquinoline-7-sulfonamide, m.p. 199°–201 °C, of the formula

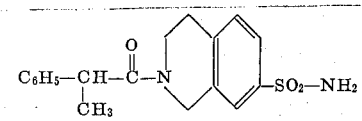

were obtained.
Analysis:C₁₈H₂₀N₂O₃S; mol. wt. 344.4
Calculated:C — 62.78%;H — 5.85%;N — 8.13%
Found:C —62.80%;H — 5.93%;N — 8.03%

EXAMPLE E

N-[2-(3'-Phenyl-propionyl)-1,2,3,4-tetrahydro-isoquinoline-7-sulfonyl]-carbamic acid ethyl ester A mixture consisting of 20.2 gm (0.06 mol) of 2-(3'-phenyl-propionyl)-1,2,3,4-tetrahydro-isoquinoline-7-sulfonamide (m.p. 222°–227°C), 33.2 gm (0.24 mol) of potassium carbonate, 26.0 gm (0.24 mol) of ethyl chloroformate and 350 ml of anhydrous acetone was refluxed for 24 hours. Thereafter, the reaction mixture was filtered, the filtrate was evaporated in vacuo, and the residue (31 gm) was dissolved in chloroform. THe resulting solution was extracted several times with dilute sodium hydroxide (pH 8–9), the combined aqueous alkaline extract solutions were made acid with hydrochloric acid and then extracted with chloroform, and the chloroform extract was dried and evaporated, leaving 12.9 gm of raw N-[2-(3'-phenyl-propionyl)-1,2,3,4-tetrahydro-isoquinoline-7-sulfonyl]-carbamic acid ethyl ester (solidified foam; thin-layer chromatographically uniform).

The chloroform solution, which had been extracted with aqueous alkali as described above, was dried and evaporated, leaving 18.2 gm of raw N,N-bis-earbethoxy-2-(3'-phenyl -propionyl)-1,2,3,4-tetrahydro-isoquinoline-7-sulfonamide having a honey-like consistency. This product was admixed with an ethanolic solution of three equivalents of sodium hydroxide and a little water (exothermic reaction), the solution was evaporated in vacuo, and the residue was treated twice with hot ethanol, i.e., by adding a little ethanol thereto and then boiling off the alcohol. The residue -phenyl-propionyl)-dissolved in hot water, the resulting alkaline solution was extracted with chloroform, made acid with hydrochloric acid and again extracted with chloroform.

Evaporation of the combined chloroform extracts yielded an additional 11.4 gm of the desired carbamic acid ester.

The two batches of recovered raw product (11.4 gm + 12.9 gm) were combined and recrystallized from ethylacetate/ether, yielding 18.25 gm of colorless N-[2-(3'-phenyl-propionyl)-1,2,3,4-tetrahydro-isoquinoline-7-sulfonyl]-carbamic acid ethyl ester, m.p. 138°–141°C (decomp.), of the formula

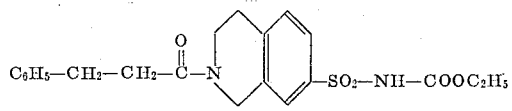

Analysis:$C_{21}H_{24}N_2O_5S$:mol. wt. 416.5
Calculated:N — 6.73%;S — 7.52%
Found:N — 6.77%;S — 7.73%

EXAMPLE F

N-[2-(2'-Phenyl-propionyl)-1,2,3,4-tetrahydro-isoquinoline-7-sulfonyl]-carbamic acid ethyl ester A mixture consisting of 8.4 gm (0.0244 mol) of 2-(2'-phenyl-propionyl)-1,2,3,4-tetrahydro-isoquinoline-7-sulfonamide (m.p. 199°–201°C), 10.8 gm (0.10 mol) of ethyl chloroformate, 14.0 gm (0.10 mol) of potassium carbonate and 200 ml of anhydrous acetone was refluxed for 32 hours. Thereafter, the undissolved components were separated by vacuum filtration, the filtrate was evaporated, and the residue was taken up in dilute sodium hydroxide. The aqueous alkaline solution was extracted with chloroform, then acidified with hydrochloric acid and again extracted with chloroform. Evaporation of each of the chloroform extract solutions yielded 3.5 gm and 8.1 gm, respectively, of the raw product.

The 3.5 gm batch obtained from the chloroform extraction of the aqueous alkaline solution was admixed with sodium hydroxide and ethanol, the mixture was evaporated at 60°C in a rotation evaporator, the residue was taken up in water, and the resulting alkaline solution was extracted with chloroform, then made acid with hydrochloric acid, and the acid solution was again extracted with chloroform, and this last acidic chloroform extract was evaporated, yielding 2.7 gm of raw product which were combined with the 8.1 gm of raw product obtained from the previous acidic chloroform extract. The raw product was dissolved in ethanol, and the solution was treated with activated charcoal, filtered and dried, yielding 9.2 gm of the chromatographically uniform, foam-like compound named in the heading of this example.

EXAMPLE G

N-[2-(3'-phenyl-butyryl)-1,2,3,4-tetrahydro-isoquinoline-7-sulfonyl]-carbamic acid ethyl ester A mixture consisting of 21.5 gm (0.06 mol) of 2-(3'-phenyl-butyryl)-1,2,3,4-tetrahydro-isoquinoline-7-sulfonamide (m.p. 164°–166°C), 26.1 gm (0.24 mol) of ethyl chloroformate, 33.2 gm (0.24 mol) of potassium carbonate and 600 ml of anhydrous acetone was refluxed for 32 hours. Thereafter, the reaction mixture was worked up as described in Example F. The two acidic chloroform extracts yielded 11.6 gm and 10.2 gm of raw product, respectively, which were combined and recrystallized from ethylacetate/ether. 16.0 gm of uniform N-[2-(3'-phenyl-butyryl)-1,2,3,4-tetrahydro-isoquinoline-7-sulfonyl]-carbamic acid ethyl ester, m.p. 105°–108°C, were obtained.

Analysis:$C_{22}H_{26}N_2O_5S$;mol.wt. 430.5
Calculated:C — 61.39%;H — 6.09%;N — 6.51%
Found:C — 61.20%;H — 6.07%;N — 6.68%

EXAMPLE H

N-[2(2'-p-Chlorophenyl-propionyl)-1,2,3,4-tetrahydroisoquinoline-7-sulfonyl]-carbamic acid ethyl ester A mixture consisting of 10.35 gm (27.4 millimols) of 2-(2'-p-chlorophenyl-propionyl)-1,2,3,4-tetrahydro-isoquinoline-7-sulfonamide (m.p. 147°–150°C), 12.2 gm (112 millimols) of ethyl chloroformate, 15.5 gm (112 millimols) of potassium carbonate and 200 ml of anhydrous acetone was refluxed for 43 hours. Thereafter, the undissolved components were separated by vacuum filtration, the filtrate was evaporated, and the residue was dissolved in 2 N sodium hydroxide. The resulting aqueous alkaline solution was extracted with chloroform, made acid with hydrochloric acid and again extracted with chloroform. The chloroform extracts were each evaporated, yielding 15.6 gm and 0.1 gm, respectively, of the raw product. The 15.6 gm-batch obtained from the chloroform extract of the alkaline solution was taken up in a mixture of chloroform and dilute hydrochloric acid, and the chloroform phase was separated and evaporated, leaving 12.7 gm of a yellowish, foamy product which was purified by column -chromatography on silicagel (solvent system cyclohexane:acetone:glacial acetic acid = 60:20:0.4). 8.0 gm of uniform, glassy N-[2-(2'-p-chlorophenyl-propionyl)-1,2,3,4-tetrahydroisoquinoline-7-sulfonyl]-carbamic acid ethyl ester (IR-spectrum peak at 1,760 cm⁻¹ for

EXAMPLE I 2-(2'-p-Bromophenyl-propionyl)-1,2,3,4-tetrahydro-isoquinoline-7-sulfonamide A solution of 7.80 gm (31.4 millimols) of 1,2,3,4-tetrahydro-isoquinoline-7sulfonamide hydrochloride, 7.20 gm (31.4 millimols) of p-bromo-hydratropic acid, 3.18 gm (31.4 millimols) of triethylamine and 7.22 gm (62.8 millimols) of N-hydroxy-succinimide in 500 ml of anhydrous dimethylformamide was admixed at −22°C with a solution of 12.96 gm (62.8 millimols) of dicyclohexyl-carbodiimide in 83 ml of dimethylformamide. The mixture was allowed to stand for 2 hours at −22°C and then for 20 hours at 20°C, whereupon the precipitate formed during that time was separated by vacuum filtration, and the filtrate was evaporated in vacuo at 12 mm Hg. The residue was dissolved in ethylacetate, and the solution was extracted with aqueous sodium bicarbonate, then with 2 N hydrochloric acid and finally with water. The ethylacetate solution was dried, filtered and evaporated, leaving as a residue 13 gm of the raw reaction product which was purified by column-chromatography on silicagel (solvent system cyclohexane:acetone = 3:2). 5.2 gm of 2-(2'-p-bromophenyl-propionyl)-1,2,3,4-tetrahydro-isoquinoline-7-sulfonamide, m.p. 146°–148°C (recrystallized from ethylacetate), of the formula

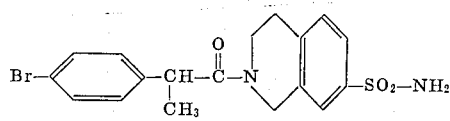

were obtained.
Analysis: $C_{18}H_{19}Br\,N_2O_3S$; mol. wt. 423.4
  Calculated: C — 51.07%; H — 4.52%; N — 6.62%
  Found: C — 51.30%; H — 4.38%; N — 6.74%

EXAMPLE J

2(2′-p-Chlorophenyl-propionyl)-1,2,3,4-tetrahydro-isoquinoline-7-sulfonamide

Fourteen gm (66 millimols) of 1,2,3,4-tetrahydro-isoquinoline-7-sulfonamide were dissolved in 850 ml of hot anhydrous dioxane. While the solution was still warm, 12.2 gm (66 millimols) of p-chloro-hydratropic acid were added thereto, and the mixture was cooled to 10°C. At that temperature, a solution of 14.9 gm (72 millimols) of dicyclohexyl-carbodiimide in 70 ml of dioxane was added over a period of 10 minutes; after 5 minutes the mixed solution turned cloudy, and a colorless precipitate began to separate out. The reaction mixture was allowed to stand for 16 hours at 20°C and was then vacuum-filtered, and the filtrate was evaporated in a vacuum of 12 mm Hg. The residual light yellow, viscous oil (37 gm) was taken up in a large amount of chloroform, and the solution was extracted with 2 N sodium hydroxide until no more sulfonamide could be chromatographically detected in the organic phase. The sodium hydroxide extracts were combined and stirred into a mixture of ice and hydrochloric acid. The acid aqueous mixture was again extracted with chloroform, and the extract was evaporated, yielding as the residue 17.4 gm of raw product which was purified by column-chromatography on silicagel (solvent system, cyclohexane:acetone:glacial acetic acid = 60:40:0.4). The purified product was recrystallized from ethylacetate, yielding 10.3 gm of colorless 2-(2′-p-chorophenyl-propionyl)-1,2,3,4-tetrahydro-isoquinoline-7-sulfonamide, m.p. 147°–150°C.
Analysis: $C_{18}H_{19}Cl\,N_2O_3S$; mol. wt. 378.9
  Calculated: C — 57.06%; H — 5.05%; N — 7.39%
  Found: C — 56.95%; H — 5.18%; N — 7.20%

EXAMPLE K 3-(2′-p-Bromophenyl-propionyl)-2,3,4,5-tetrahydro-1H-3-benzazepine-7-sulfonamide Solvent-free p-bromo-hydratropic acid chloride, prepared from 8.0 gm (35 millimols) of p-bromo-hydratropic acid and $SOCl_2$ in chloroform, was added at 5°C to a solution of 7.92 gm (35 millimols) of 2,3,4,5-tetrahydro-1H-3-benzazepine-7-sulfonamide in 100 ml of anhydrous pyridine, and the mixture was allowed to stand overnight at 20°C. Thereafter, the pyridine was distilled off in vacuo, the residue was stirred with aqueous hydrochloric acid and collected by vacuum filtration, the filter cake was dissolved in hot 2 N sodium hydroxide, and the alkaline solution was extracted with chloroform. The alkaline aqueous phase was stirred into a mixture of ice and hydrochloric acid, the acid aqueous solution was again extracted with chloroform, and the chloroform extract solution was thoroughly extracted with aqueous sodium bicarbonate and then with water. Evaporation of the chloroform phase yielded 7.9 gm of foamy 3-(2′-p-bromophenyl-propionyl)-2,3,4,5-tetrahydro-1H-3-benzazepine-7-sulfonamide of the formula

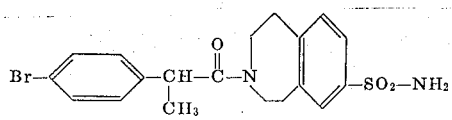

Analysis: $C_{19}H_{21}Br\,N_2O_3S$; mol. wt. 437.4
  Calculated: C — 52.16%; H — 4.84%; N — 6.41%
  Found: C — 52.00%; H — 4.61%; N — 6.39%

EXAMPLE L 2,3,4,5-Tetrahydro-1H-3-benzazepine-7-sulfonamide a. 130.6 gm (0.688 mol) of 3-acetyl-2,3,4,5-tetrahydro-1H-3-benzazepine (m.p. 60°–63°C) were added in small portions over a period of 90 minutes to 588 gm (5.06 mols) of chlorosulfonic acid at −5°C, and the mixture was stirred for 4 hours at −5° to 0°C. Thereafter, the solution was poured over ice, and the aqueous mixture was extracted with benzene. The benzene extract was dried and evaporated, leaving 164 gm of raw 3-acetyl-2,3,4,5-tetrahydro-1H-3-benzazepine-7-sulfochloride as a viscous oil.

b. The raw sulfochloride obtained in (a) was added to 400 ml of concentrated ammonia, the mixture was gently heated on a water bath, whereby a clear solution was quickly formed, and the solution was allowed to cool. 84.7 gm of colorless 3-acetyl-2,3,4,5-tetrahydro-1H-3-benzazepine-7-sulfonamide, m.p. 177°–180°C, precipitated out. Upon extraction of the mother liquor with ethylacetate and evaporation of the extract solution, an additional 7.6 gm of the product (m.p. 176°–180°C) were recovered.
Analysis: $C_{12}H_{16}N_2O_3S$; mol. wt. 268.3
  Calculated: C — 53.72%; H — 6.01%; N — 10.44%
  Found: C — 53.50%; H — 6.10%; N — 10.20% c. All of the 92.3 gm of sulfonamide obtained in (b) were admixed with 1 liter of semi-concentrated hydrochloric acid, and the mixture was refluxed for 15 hours. Thereafter, the acidic solution was evaporated to dryness, the residue was treated several times with boiling ethanol, i.e., by adding ethanol and boiling the alcohol off again, and then one equivalent of 1 N sodium hydroxide was added. The alkaline mixture as heated, stirred and allowed to cool, yielding 72.8 gm of raw crystallizate, m.p. 218°–220°C. The raw product was recrystallized from 2 liters of aqueous ethanol, yielding 47.2 gm of colorless 2,3,4,5-tetrahydro-1H-3-benzazepine-7-sulfonamide, m.p. 225°–228°C, of the formula

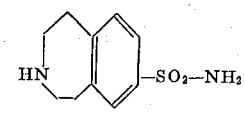

Analysis: $C_{10}H_{14}N_2O_2S$; mol. wt. 226.3
  Calculated: C — 53.07%; H — 6.25%; N — 12.37%
  Found: C — 52.50%; H — 6.17%; N — 12.24%

The following table lists additional sulfonamide starting compounds of the formula II which were prepared in analogy to Examples C, D, I, J or K above.

TABLE $$R_1-A-\overset{\overset{O}{\|}}{C}-N\underset{(CH_2)_n}{\text{[tetrahydronaphthalene]}}-SO_2-NH_2$$

| $R_1$ | n | A | M.P. | Prepared analogous to Example |
|---|---|---|---|---|
| p-Fluorophenyl— | 1 | —CH(CH₃)— | 165–169° C | D |
| p-Chlorophenyl— | 1 | —CH(CH₃)— | 147–150° C | J |
| p-Bromophenyl— | 1 | —CH(CH₃)— | 146–148° C | I |
| m,p-Dichlorophenyl— | 1 | —CH(CH₃)— | 200–202° C | D |
| p-Methylphenyl— | 1 | —CH(CH₃)— | 165–168° C | D |
| p-Trifluoromethylphenyl— | 1 | —CH(CH₃)— | Viscous oil | D |
| p-Ethoxyphenyl— | 1 | —CH(CH₃)— | Foam | D |
| p-n-Propoxyphenyl— | 1 | —CH(CH₃)— | do | D |
| p-Diphenyl— | 1 | —CH(CH₃)— | 188–192° C | D |
| α-Naphthyl— | 1 | —CH(CH₃)— | 203–207° C | D |
| p-Chlorophenyl— | 2 | —CH(CH₃)— | Foam | K |
| p-Bromophenyl— | 2 | —CH(CH₃)— | do | K |
| n-Propyl— | 1 | | 159–162° C | C |
| iso-Butyl— | 1 | | 142–145° C | D |
| Phenyl— | 1 | | 222–224° C | C |
| m-Tolyl— | 1 | | 240–247° C | C |
| p-Tolyl— | 1 | | 230–235° C | C |
| o-Methoxyphenyl— | 1 | | 232–238° C | C |
| p-Methoxyphenyl— | 1 | | 220–225° C | C |
| m-Trifluoromethylphenyl— | 1 | | 250–255° C | C |
| Naphthyl—(1) | 1 | | 240–245° C | C |
| 1,2,3,4-tetrahydronaphthyl—(1) | 1 | —CH₂— | Foamy | D |
| Indanyl—(1) | 1 | —CH₂— | 160–165° C | D |
| Phenyl— | 1 | —CH₂— | 182–187° C | C |
| Do | 1 | —CH(CH₃)— | 199–201° C | D |
| Do | 1 | —CH(C₂H₅)— | 158° C | D |
| Benzoyl— | 1 | —CH₂— | 151–153° C | (*) |
|  | 1 | —CH₂—CH₂— | 187–189° C | D |
| Phenyl— | 1 | —CH₂—CH₂— | 222–227° C | C |
| 4-methylphenyl— | 1 | —CH₂—CH₂— | 154–160° C | D |
| p-Chlorophenyl— | 1 | —CH₂—CH₂— | 155–161° C | D |
| m-Chlorophenyl— | 1 | —CH₂—CH₂— | 172–174° C | D |
| p-Trifluoromethylphenyl— | 1 | —CH₂—CH₂— | 184–186° C | D |
| p-Methoxyphenyl— | 1 | —CH₂—CH₂— | 166–167° C | D |
| o-Methoxyphenyl— | 1 | —CH₂—CH₂— | 145–146° C | D |
| Phenyl— | 1 | —CH₂—CH(CH₃)— | 214–215° C | C |
| Do | 1 | —CH(CH₃)—CH₂— | 164–166° C | C |
| Do | 1 | —CH(C₂H₅)—CH₂— | Solid foam | D |
| Do | 1 | —CH(C₃H₇)—CH₂— | 130–134° C | D |
| Do | 1 | —CH(CH(CH₃)₂)—CH₂— | 164–169° C | C |

TABLE Continued

| R₁ | n | A | M.P. | Prepared analogous to Example |
|---|---|---|---|---|
| Do | 1 | —CH—CH₂—<br>    \|<br>    C₆H₅ | 246–250° C | C |
| Do | 1 | —CH₂—CH₂—CH₂— | 140–146° C | C |

*From benzoyl ethyl acetate and 1, 2, 3, 4-tetrahydro-isoquinoline-7-sulfonamide in xylene.

The following examples further illustrate the present invention and will enable others skilled in the art to understand it more completely. It should be understood, however, that the invention is not limited solely to the particular examples given below.

EXAMPLE 1

Preparation of 1,2,3,4-Tetrahydro-2-(3'-phenyl-propionyl)-7-(N'-cyclohexyl-ureido-N-sulfonyl-isoquinoline by method A 41.4 gm (0.12 mol) of 2-(3'-phenyl-propionyl)-1,2,3,4-tetrahydro-isoquinoline-7-sulfonamide (m.p. 222°–227°C) were admixed with an equimolar amount of 1 N sodium hydroxide (120 ml) and 200 ml of ethanol, the solution was evaporated to dryness in vacuo, and the residue was dried for 30 minutes at 80°C in a vacuum of 12 mm Hg, yielding the sodium salt of 2-(3'-phenyl-propionyl)-1,2,3,4-tetrahydro-isoquinoline-7-sulfonamide. This sodium salt was suspended in 1 liter of nitrobenzene, and 15.05 gm (0.12 mol) of cyclohexyl isocyanate were added dropwise to the suspension. The mixture was stirred for 5 hours at 95°C and then cooled, the precipitate formed thereby was centrifuged off and dissolved in hot water, the hot aqueous solution was allowed to cool, extracted with ether and poured into a mixture consisting of ice and an excess of concentrated hydrochloric acid. The precipitate formed thereby was collected by vacuum filtration, washed with a large amount of water, thoroughly air-dried by suction and taken up in ethanol. The ethanolic solution was evaporated in vacuo, the residue was taken up in hot ethylacetate, the resulting solution was dried over sodium sulfate and filtered, and the filtrate was concentrated by evaporation to the point where the solution just stayed clear at the boiling point. Upon cooling thereof, 31.5 gm of 1,2,3,4-tetrahydro-2-(3'-phenyl-propionyl)-7-(N'-cyclohexyl-ureido-N-sulfonyl)-isoquinoline, m.p. 135°–140°C (thin-layer chromatogram : single spot), of the formula

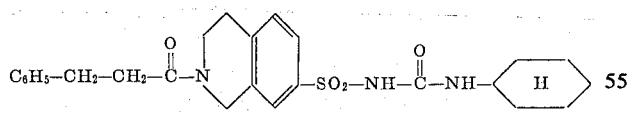

crystallized out.

Analysis: $C_{25} H_{31} N_3 O_4 S$; mol. wt. 469.6
    Calculated: C — 63.95%; H — 6.65%; N — 8.95%
    Found: C — 64.00%; H — 6.55%; N — 9.02%

EXAMPLE 2

Using a procedure analogous to that described in Example 1, 1,2,3,4-tetrahydro-2-(2'-phenyl-propionyl)-7-(N'-cyclohexyl-ureido-N-sulfonyl)-isoquinoline, m. p. 195°–197°C. (from ethanol), of the formula

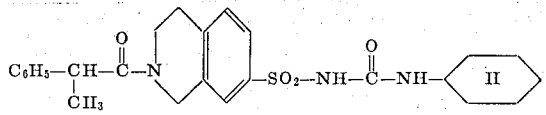

was prepared from 10.3 gm of 2-(2'-phenyl-propionyl)-1,2,3,4-tetrahydro-isoquinoline-7-sulfonamide (m. p. 199°–201°C.) and 3.76 gm of cyclohexylisocyanate. The yield was 10.6 gm.

Analysis: $C_{25} H_{31} N_3 O_4 S$; mol. wt. 469.5
    Calculated: C — 63.95%; H — 6.65%; N — 8.95%
    Found: C — 63.80%; H — 6.75%; N — 8.80%

EXAMPLE 3

Using a procedure analogous to that described in Example 1 1,2,3,4-tetrahydro-2-acetyl-7-(N'-cyclohexylureido-N-sulfonyl)-isoquinoline, m. p. 100°–110°C. (acid precipitation), of the formula

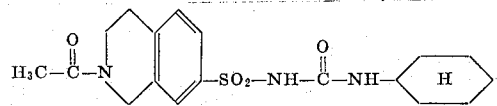

was prepared from 11.1 gm of 2-acetyl-1,2,3,4-tetrahydroisoquinoline-7- sulfonamide (m. p. 220°–224 °C.) and 5.46 gm of cyclohexylisocyanate. The yield was 8.4 gm.

Analysis: $C_{18} H_{25} N_3 O_4 S$; mol. wt. 379.4
    Calculated: C — 56.98%; H — 6.64%; N — 11.07%
    Found: C — 56.80%; H — 6.71%; N — 10.70%

EXAMPLE 4

Using a procedure analogous to that described in Example 1, 1,2,3,4-tetrahydro-2-benzoyl-7-(N'-cyclohexylureido-N-sulfonyl)-isoquinoline, m. p. 150°–155°C. (from methyl ethyl ketone), of the formula

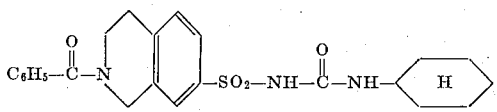

was prepared from 18.0 gm of 2-benzoyl-1,2,3,4-tetrahydroisoquinoline-7-sulfonamide, (m. p. 222°–224 °C.) and 7.15 gm of cyclohexyl isocyanate. The yield was 10.4 gm.

Analysis: $C_{23} H_{27} N_3 O_4 S$; mol. wt. 441.5
    Calculated: C — 62.57%; H — 6.16%; N — 9.52%
    Found: C — 62.60%; H — 6.12%; N — 9.31%

EXAMPLE 5

Using a procedure analogous to that described in Example 1, 1,2,3,4-tetrahydro-2-(3'-methyl-benzoyl)-7-(N'-cyclohexyl-ureido-N-sulfonyl)-isoquinoline, m. p. 154°–158°C. (after column-chromatography and stirring with ether), of the formula was prepared from 19.8 gm of 2-(3'-methyl-benzoyl)-1,2,3,4-tetrahydro-isoquinoline-7-sulfonamide, (m. p. 240°–247°C.) and 7.5 gm of cyclohexyl isocyanate. The yield was 5.2 gm.
Analysis: $C_{24} H_{29} N_3 O_4 S$; mol. wt. 455.6
    Calculated: C — 63.30%; H — 6.42%; N — 9.22%
    Found: C — 63.00%; H — 6.27%; N — 8.79%

EXAMPLE 6

Using a procedure analogous to that described in Example 1, 1,2,3,4-tetrahydro-2-(4'-methyl-benzoyl)-7-(N'-cyclohexyl-ureido-N-sulfonyl)-isoquinoline, m. p. 130°–135°C. (after column-chromatography and stirring with ether), was prepared from 21.4 gm of 2-(4'-methyl-benzoyl)-1,2,3,4-tetrahydro-isoquinoline-7-sulfonamide, (m. p. 230°–235°C.) and 8.14 gm of cyclohexyl isocyanate. The yield was 6.2 gm.
Analysis: $C_{24} H_{29} N_3 O_4 S$; mol. wt. 455.6
    Calculated: C — 63.30%; H — 6.42%; N — 9.22%
    Found: C — 63.00%; H — 6.40%; N — 8.79%

EXAMPLE 7

Using a procedure analogous to that described in Example 1, 1,2,3,4-tetrahydro-2-(2'-methyl-3'-phenyl-propionyl)-7-(N'-cyclohexyl-ureido-N-sulfonyl)-isoquinoline, m. p. 104°–110°C. (acid precipitation), of the formula was prepared from 14.34 gm of 2-(2'-methyl-3'-phenylpropionyl)-1,2,3,4-tetrahydro-isoquinoline-7-sulfonamide, (m. p. 214°–215°C.) and 5.01 gm of cyclohexyl isocyanate. The yield was 9.8 gm.
Analysis: $C_{26} H_{33} N_3 O_4 S$; mol. wt. 483.7.
    Calculated: C — 64.58%; H — 6.88%; N — 8.69%
    Found: C — 64.50%; H — 6.93%; N — 8.72%

EXAMPLE 8

Using a procedure analogous to that described in Example 1, 1,2,3,4-tetrahydro-2-(α-naphthoyl)-7-(N'-cyclohexyl-ureido-N-sulfonyl)-isoquinoline, m. p. 170°–175°C. (after column-chromatography and stirring with acetone), of the formula was prepared from 18.3 gm of 2-(α-naphthoyl)-1,2,3,4-tetrahydro-isoquinoline-7-sulfonamide, (m. p. 240°–245°C.) and 6.3 gm of cyclohexyl isocyanate. The yield was 4.5 gm.
Analysis: $C_{27} H_{29} N_3 O_4 S$; mol. wt. 491.6
    Calculated: C — 66.00%; H — 5.95%; N — 8.55%
    Found: C — 65.90%; H — 5.85%; N — 8.74%

EXAMPLE 9

Using a procedure analogous to that described in Example 1, 1,2,3,4-tetrahydro-2-(2'-methoxy-benzoyl)-7-(N'-cyclohexyl-ureido-N-sulfonyl)-isoquinoline, m. p. 145°–150°C. (from ethanol), of the formula was prepared from 13.9 gm of 2-(2'methoxy-benzoyl)-1,2,3,4-tetrahydro-isoquinoline-7-sulfonamide, (m. p. 232°–238°C.) and 5.02 gm of cyclohexyl isocyanate. The yield was 9.5 gm.
Analysis: $C_{24} H_{29} N_3 O_5 S$; mol. wt. 471.6
    Calculated: C — 61.14%; H — 6.20%; N — 8.91%
    Found: C — 60.60%; H — 6.18%; N — 9.09%

EXAMPLE 10

Using a procedure analogous to that described in Example 1, 1,2,3,4-tetrahydro-2-(4'-methoxy-benzoyl)-7-(N'-cyclohexyl-ureido-N-sulfonyl)-isoquinoline, m. p. 196°–198°C. (from methyl ethyl ketone), was prepared from 13.9 gm of 2-(4'-methoxy-benzoyl)-1,2,3,4-tetrahydro-isoquinoline-7-sulfonamide, (m. p. 220°–225°C.) and 5.02 gm of cyclohexyl isocyanate. The yield was 7.0 gm.
Analysis: $C_{24} H_{29} N_3 O_5 S$; mol. wt. 471.6
    Calculated: C — 61.14%; H — 6.20%; N — 8.91%
    Found: C — 60.80%; H — 6.17%; N — 8.76%

EXAMPLE 11

Using a procedure analogous to that described in Example 1, 1,2,3,4-tetrahydro-2-phenylacetyl-7-(N'-cyclohexyl-ureido-N-sulfonyl)-isoquinoline, m. p. 140°–145°C. (after stirring with ethylacetate and ether), of the formula was prepared from 5.57 gm of 2-phenylacetyl-1,2,3,4-tetrahydro-isoquinoline-7-sulfonamide, (m. p. 182°–187°C.) and 2.12 gm of cyclohexyl isocyanate. The yield was 5.0 gm.
Analysis: $C_{24} H_{29} N_3 O_4 S$; mol. wt. 455.6
    Calculated: C — 63.28%; H — 6.42%; N — 9.22%
    Found: C — 63.00%; H — 6.52%; N — 9.14%

EXAMPLE 12

Using a procedure analogous to that described in Example 1, 1,2,3,4-tetrahydro-2-(3',3'-diphenyl-propionyl)-7-(N'-cyclohexyl-ureido-N-sulfonyl)-isoquinoline, m. p. 171°–174°C. (reprecipitated from acetone with water), of the formula

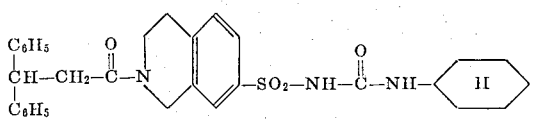

was prepared from 12.6 gm of 2-(3',3'-diphenyl-propionyl)-1,2,3,4-tetrahydro-isoquinoline-7-sulfonamide, (m. p. 246°–250°C.) and 3.80 gm of cyclohexyl isocyanate. The yield was 9.55 gm.
Analysis: $C_{31}H_{35}N_3O_4S$; mol. wt. 545.7
Calculated: C — 68.23%; H — 6.46%; N — 7.70%
Found: C — 68.20%; H — 6.34%; N — 7.65%

EXAMPLE 13

Using a procedure analogous to that described in Example 1, 1,2,3,4-tetrahydro-2-(4'-phenyl-butyryl)-7-(N'-cyclohexyl-ureido-N-sulfonyl)-isoquinoline, m. p. 77°–85C. (recrystallized from ether with petroleum ether), of the formula

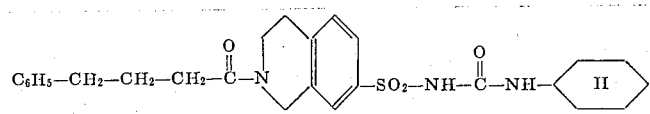

was prepared from 7.17 gm of 2-(4'-phenyl-butyryl)-1,2,3,4-tetrahydro-isoquinoline-7-sulfonamide, (m. p. 140°–146°C.) and 2.51 gm of cyclohexyl isocyanate. The yield was 2.7 gm.
Analysis: $C_{26}H_{33}N_3O_4S$; mol. wt. 483.7
Calculated: C — 64.58%; H — 6.88%; N — 8.69%
Found: C — 64.80%; H — 6.79%; N — 8.39%

EXAMPLE 14

Using a procedure analogous to that described in Example 1, 1,2,3,4-tetrahydro-2-(3'-benzoyl-propionyl)-7-(N'-cyclohexyl-ureido-N-sulfonyl)-isoquinoline, m. p. 183°–184°C. (from acetone), of the formula

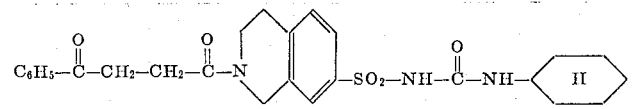

was prepared from 3.37 gm of 2-(3'-benzoyl-propionyl)-1,2,3,4-tetrahydro-isoquinoline-7-sulfonamide, (m. p. 187°–189°C.) and 1.14 gm of cyclohexyl isocyanate. The yield was 3.7 gm.
Analysis: $C_{26}H_{31}N_3O_5S$; mol. wt. 497.7
Calculated: C — 62.77%; H — 6.28%; N — 8.45%
Found: C — 62.50%; H — 6.20%; N — 8.26%

EXAMPLE 15

Using a procedure analogous to that described in Example 1, 1,2,3,4-tetrahydro-2-(3'-p-tolyl-propionyl)-7-(N'-cyclohexyl-ureido-N-sulfonyl)-isoquinoline, m. p. 134°–136°C. (from ethyl acetate), of the formula

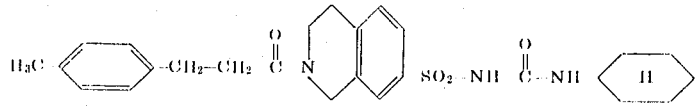

was prepared from 6.10 gm of 2-(3'-p-tolyl-propionyl)-1,2,3,4-tetrahydro-isoquinoline-7-sulfonamide, (m. p. 154°–160°C.) and 2.13 gm of cyclohexyl isocyanate. The yield was 4.5 gm.
Analysis: $C_{26}H_{33}N_3O_4S$; mol. wt. 483.7
Calculated: C — 64.58%; H — 6.88%; N — 8.69%
Found: C — 64.50%; H — 6.89%; N — 8.52%

EXAMPLE 16

Using a procedure analogous to that described in Example 1, 1,2,3,4-tetrahydro-2-[3'-(p-trifluoromethylphenyl)-propionyl]-7-(N'-cyclohexyl-ureido-N-sulfonyl)-isoquinoline, m. p. 130°–133°C. (from ethyl acetate), of the formula

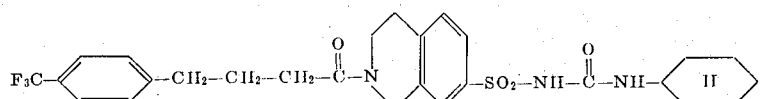

was prepared from 3.10 gm of 2-[3'-(p-trifluoromethyl-phenyl)-propionyl]-1,2,3,4-tetrahydro-isoquinoline-7-sulfonamide, (m. p. 184°–186°C.) and 0.95 gm of cyclohexyl isocyanate.
The yield was 1.7 gm.

Analysis: $C_{26}H_{30}F_3N_3O_4S$; mol. wt. 537.6
Calculated: C — 58.09%; H — 5.63%; N — 7.82%
Found: C — 58.10%; H — 5.80%; N — 7.81%

EXAMPLE 17

Using a procedure analogous to that described in Example 1, 1,2,3,4-tetrahydro-2-[3'-(o-methoxy-phenyl)-propionyl]-7-(N'-cyclohexyl-ureido-N-sulfonyl)-isoquinoline, m. p. 194°–196°C. (decomp.; from ethanol), was prepared from 11.2 gm of 2-[3'-(o-methoxy-phenyl)-propionyl]-1,2,3,4-tetrahydro-isoquinoline-7-sulfonamide, (m. p. 232°–238°C.) and 3.76 gm of cyclohexyl isocyanate. The yield was 11.1 gm.
Analysis: $C_{26}H_{33}N_3O_5S$; mol. wt. 499.6
Calculated: C — 62.51%; H — 6.66%; N — 8.41%
Found: C — 62.50%; H — 6.75%; N — 8.45%

EXAMPLE 18

Using a procedure analogous to that described in Example 1, 1,2,3,4-tetrahydro-2-(2'-phenyl-butyryl)-7-(N'-cyclohexyl-ureido-N-sulfonyl)-isoquinoline, m. p. 181°–185°C. (from ethanol), of the formula

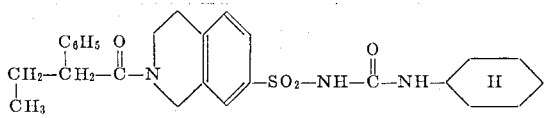

was prepared from 6.9 gm of 2-(2'-phenyl-butyryl)-1,2,3,4-tetrahydro-isoquinoline-7-sulfonamide, (m. p. 158°C.) and 2.41 gm of cyclohexyl isocyanate. The yield was 5.7 gm.

Analysis: $C_{26} H_{33} N_3 O_4 S$; mol. wt. 483.7

Calculated: C — 64.58%; H — 6.88%; N — 8.69%
Found: C — 64.60%; H — 7.02%; N — 8.70%

EXAMPLE 19

Sodium salt of 1,2,3,4-tetrahydro-2-[3'-(m-chlorophenyl)-propionyl]-7-(N'-cyclohexyl-ureido-N-sulfonyl)-isoquinoline A mixture consisting of 11.4gm (0.03 mol) of 2-(3'-m-chlorophenyl-propionyl)-1,2,3,4-tetrahydro-isoquinoline-7-sulfonamide (m. p. 172°–174°C.), a solution of 1.68 gm (0.03 mol) of potassium hydroxide in 20 ml of water, and 100 ml of ethanol was evaporated to dryness in vacuo. The dry potassium salt of the sulfonamide thus obtained was added to 300 ml of nitrobenzene, 3.76 gm (0.03 mol) of cyclohexyl isocyanate were added dropwise thereto, and then the reaction mixture was stirred for 5 hours at 100°C. Thereafter, the nitrobenzene was removed by steam distillation, the residue was dissolved in hot water, and the hot aqueous solution was filtered through a G3-frit into an agitated mixture of ice and excess concentrated hydrochloric acid. The precipitate formed thereby was taken up in hot ethanol, the solution was treated with activated charcoal and then filtered, and the hot filtrate was admixed with a solution of one equivalent of sodium hydroxide in the minimum required amount of water. Upon cooling, 6.5 gm of the sodium salt of 1,2,3,4-tetrahydro-2-[3'-(m-chlorophenyl)-propionyl]-7-(N'-cyclohexyl-ureido-N-sulfonyl)-isoquinoline, which decomposed beginning at 280°C., crystallized out.

Analysis: $C_{25} H_{29} Cl_{N3} O_4 S Na$; mol. wt. 526.1

Calculated: C — 57.08%; H — 5.56%; N — 7.99%
Found: C — 57.30%; H — 5.67%; N — 7.80%

EXAMPLE 20

Sodium salt of 2-(3'-phenyl-butyryl)-1,2,3,4-tetrahydro-7-(N'-cyclohexyl-ureido-N-sulfonyl)-isoquinoline A mixture consisting of 12.53 gm (0.035 mol) of 2-(3'-phenyl-butyryl)-1,2,3,4-tetrahydro-isoquinoline (m. p. 164°–166°C.), 35 ml of 1N sodium hydroxide and 100 ml of ethanol was evaporated to dryness in vacuo. The dry sodium salt of the sulfonamide thus obtained was suspended in 300 ml of nitrobenzene, and 4.38 gm (0.035 mol) of cyclohexyl isocyanate were added dropwise to the suspension. Thereafter, the mixture was stirred for 5 hours at 100°C., and then the precipitate which had formed was separated by centrifuging and dissolved in hot water. The aqueous solution was allowed to cool, was then extracted with ether, thereafter heated again, and finally filtered through a G3-frit into an agitated mixture of ice and excess concentrated hydrochloric acid. The precipitate formed thereby was collected by vacuum filtration and dissolved in hot ethanol, and then a solution of 0.035 mol of sodium hydroxide in the minimum required amount of water was added to the ethanolic solution. Upon cooling, 8.3 gm of the colorless sodium salt of 2-(3'-phenyl-butyryl)-1,2,3,4-tetrahydro-7-(N'-cyclohexyl-ureido-N-sulfonyl)-isoquinoline, m. p. 280°–285°C. (decomp.) crystallized out.

Analysis: $C_{26} H_{32} N_3 O_4 S Na$; mol. wt. 505.6

Calculated: C — 61.72%; H — 6.38%; N — 8.30%
Found: C — 61.40%; H — 6.42%; N — 8.30%

EXAMPLE 21

Using a procedure analogous to that described in Example 20, the sodium salt of 1,2,3,4-tetrahydro-2-butyryl-7-(N'-cyclohexyl-ureido-N-sulfonyl)-isoquinoline, m. p. >300°C. (from ethanol), was prepared from 8.46 gm of 2-butyryl-1,2,3,4-tetrahydro-isoquinoline-7-sulfonamide (m. p. 159°–162°C.) and 3.76 gm of cyclohexyl isocyanate. The yield was 10.0 gm.

Analysis: $C_{20} H_{28} N_3 O_4 S Na$; mol. wt. 429.5

Calculated: C — 55.93%; H — 6.57%; N — 9.78%
Found: C — 55.60%; H — 6.68%; N — 9.66%

EXAMPLE 22

Using a procedure analogous to that described in Example 20, the sodium salt of 1,2,3,4-tetrahydro-2-(3'-phenyl-propionyl)-7-(N'-n-butyl-ureido-N-sulfonyl)-isoquinoline, m. p. 244°–245°C. (decomp.; from ethanol), of the formula

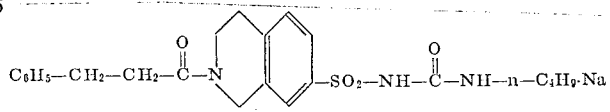

was prepared from 10.3 gm of 2-(3'-phenyl-propionyl)-1,2,3,4-tetrahydro-isoquinoline-7-sulfonamide (m. p. 222°–227°C.) and 2.98 gm of n-butyl-isocyanate. The yield was 10.1 gm.

Analysis: $C_{23} H_{28} N_3 O_4 S Na$; mol. wt. 465.6

Calculated: C — 59.35%; H — 6.06%; N — 9.02%
Found: C — 59.20%; H — 6.24%; N — 8.92%

EXAMPLE 23

Using a procedure analogous to that described in Example 20, the sodium salt of 1,2,3,4-tetrahydro-2-(3'-p-methoxyphenyl-propionyl)-7-(N'-cyclohexyl-ureido-N-sulfonyl)-isoquinoline, m. p. 255°C. (decomp.; from ethanol), was prepared from 6.75 gm of 2-(3'-p-methoxyphenyl-propionyl)-1,2,3,4-tetrahydro-isoquinoline-7-sulfonamide (m. p. 166°–167°C.) and 2.26 gm of cyclohexyl isocyanate. The yield was 6.8 gm.

Analysis: $C_{26} H_{32} N_3 O_5 S Na$; mol. wt. 521.6

Calculated: C — 59.87%; H — 6.18%; N — 8.06%
Found: C — 59.70%; H — 6.37%; N — 8.05%

EXAMPLE 24

Using a procedure analogous to that described in Example 20, the sodium salt of 1,2,3,4-tetrahydro-2-(3'-phenyl-hexanoyl)-7-(N'-cyclohexyl-ureido-N-sulfonyl)-isoquinoline, m. p. 255°–260°C. (from methanol), of the formula

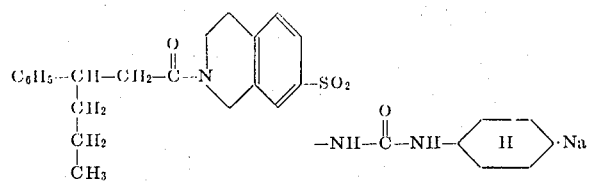

was prepared from 11.6 gm of 2-(3'-phenyl-hexanoyl)-1,2,3,4-tetrahydro-isoquinoline-7-sulfonamide (m. p. 130°–134°C.) and 3.76 gm of cyclohexyl isocyanate. The yield was 5.65 gm.
Analysis:$C_{28}H_{36}N_3O_4SNa$;mol. wt. 533.7
   Calculated:C — 63.00%;H — 6.81%;N — 7.88%
   Found:C — 63.30%;H — 7.05%;N — 7.59%

EXAMPLE 25

Using a procedure analogous to that described in Example 20, the sodium salt of 1,2,3,4-tetrahydro-2-(3'-phenyl-propionyl)-7-[N'-adamantyl-(1)-ureido-N-sulfonyl]-isoquinoline, m. p. 260°C. (decomp.; from acetone by addition of water), of the formula

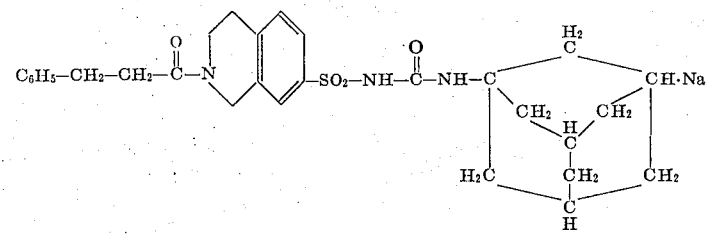

was prepared from 6.22 gm of 2-(3'-phenyl-propionyl)-1,2,3,4-tetrahydro-isoquinoline-7-sulfonamide (m. p. 222°–227°C.) and 3.20 gm of adamantyl-(1) isocyanate. The yield was 1.08 gm.
Analysis:$C_{29}H_{34}N_3O_4SNa$;mol. wt. 543.7
   Calculated:C — 64.06%;H — 6.30%;N — 7.73%
   Found:C — 64.20%;H — 6.60%;N — 7.57%

EXAMPLE 26

Using a procedure analogous to that described in Example 20, the sodium salt of 1,2,3,4-tetrahydro-2-(3'-phenyl-valeroyl)-7-(N'-cyclohexyl-ureido-N-sulfonyl)-isoquinoline, m. p. 272°–280°C. (decomp.; from ethanol), was prepared from 13.6 gm of 2-(3'-phenyl-valeroyl)-1,2,3,4-tetrahydro-isoquinoline-7-sulfonamide and 5.0 gm of cyclohexyl isocyanate. The yield was 7.65 gm.
Analysis:$C_{27}H_{34}N_3O_4SNa$;mol. wt. 519.6
   Calculated:C — 62.40%;H — 6.60%;N — 8.10%
   Found:C — 62.20%;H — 6.73%;N — 8.00%

EXAMPLE 27

Using a procedure analogous to that described in Example 20, the sodium salt of 1,2,3,4-tetrahydro-2-(3'-p-chlorophenyl-propionyl)-7-(N'-cyclohexyl-ureido-N-sulfonyl)-isoquinoline, m. p. 260°–263°C. (decomp.; from ethanol), was prepared from 4.55 gm of 2-(3'-p-chlorophenyl-propionyl)-1,2,3,4-tetrahydro-isoquinoline-7-sulfonamide (m. p. 155°–161°C.) and 1.5 gm of cyclohexyl isocyanate. The yield was 3.5 gm.
Analysis:$C_{25}H_{29}ClN_3O_4SNa$;mol. wt. 526.1
   Calculated:C — 57.08%;H — 5.56%;N — 7.99%
   Found:C — 56.90%;H — 5.63%;N — 7.80%

EXAMPLE 28

Using a procedure analogous to that described in Example 20, the sodium salt of 1,2,3,4-tetrahydro-2-isovaleroyl-7-(N'-cyclohexyl-ureido-N-sulfonyl)-isoquinoline, m. p. 290°C. (decomp.; from ethanol), was prepared from 10.4 gm of 2-(isovaleroyl-1,2,3,4-tetrahydro-isoquinoline-7-sulfonamide (m. p. 142°–145°C.) and 4.38 gm of cyclohexyl isocyanate. The yield was 8.4 gm.
Analysis:$C_{21}H_{30}N_3O_4SNa$;mol. wt. 443.6
   Calculated:C — 56.87%;H — 6.82%;N — 9.47%
   Found:C — 56.80%;H — 6.87%;N — 9.30%

EXAMPLE 29

Using a procedure analogous to that described in Example 20, the sodium salt of 1,2,3,4-tetrahydro-2-(3'-trifluoromethyl-benzoyl)-7-(N'-cyclohexyl-ureido-N-sulfonyl)-isoquinoline, m. p. 280°–285°C. (decomp.; from ethanol and ether), was prepared from 11.4 gm of 2-(3'1,2,3,4-tetrahydro-isoquinoline-7-sulfonamide (m. p. 250°–255°C.) and 3.73 gm of cyclohexyl isocyanate. The yield was 1.65 gm.
Analysis:$C_{24}H_{25}F_3N_3O_4SNa$;mol. wt. 531.6
   Calculated:C — 54.23%;H — 4.76%;N — 7.91%
   Found:C — 53.90%;H — 5.02%;N — 7.70%

EXAMPLE 30

Using a procedure analogous to that described in Example 20, the sodium salt of 1,2,3,4-tetrahydro-2-benzoylacetyl-7-(N'-cyclohexyl-ureido-N-sulfonyl)-isoquinoline, m. p. 230°–231°C. (decomp.; after column-chromatography and recrystallization from methanol), was prepared from 1.88 gm of 2-benzoylacetyl-1,2,3,4-tetrahydro-isoquinoline-7-sulfonamide (m. p. 151°–153°C.) and 0.66 gm of cyclohexyl isocyanate. The yield was 0.5 gm.
Analysis:$C_{25}H_{28}N_3O_5SNa$;mol. wt. 505.6
   Calculated:C — 59.39%;H — 5.58%;N — 8.31%
   Found:C — 59.20%;H — 5.73%;N — 8.14%

EXAMPLE 31

Using a procedure analogous to that described in Example 20, the sodium salt of 1,2,3,4-tetrahydro-2-[1',2'c',4'-tetrahydronaphthyl-(1)-acetyl]-7-(N'-cyclohexyl-ureido-N-sulfonyl)-isoquinoline, m. p. 268°–270°C. (decomp.; from ethanol), of the formula

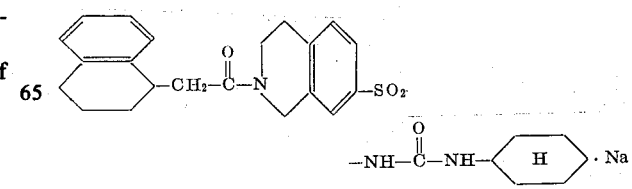

was prepared from 15.4 gm of 2-[1',2',3',4'-tetrahydronaphthyl-(1)-acetyl]-1,2,3,4-tetrahydro-isoquinoline-7-sulfonamide and 5.0 gm of cyclohexyl isocyanate. The yield was 10.0 gm.
Analysis: $C_{28} H_{34} N_3 O_4 S$ Na; mol. wt. 531.6
Calculated: C — 63.28%; H — 6.45%; N — 7.90%
Found: C — 63.50%; H — 6.76%; N — 7.82%

EXAMPLE 32

Using a procedure analogous to that described in Example 20, the sodium salt of 1,2,3,4-tetrahydro-2-[3'-(5''-chloro-2''-methoxy-phenyl)-propionyl]-7-(N'-cyclohexyl-ureido-N-sulfonyl)-isoquinoline, m. p. 270°C. (decomp.; from ethanol), of the formula

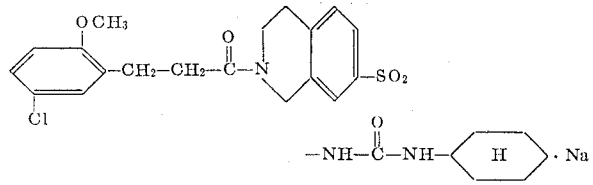

was prepared from 20.4 gm of 2-[3'-(5''-chloro-2''-methoxyphenyl)-propionyl]-1,2,3,4-tetrahydro-isoquinoline-7-sulfonamide and 6.26 gm of cyclohexyl isocyanate. The yield was 11.5 gm.
Analysis: $C_{26} H_{31} Cl N_3 O_5 S$ Na; mol. wt. 556.1
Calculated: C — 56.16%; H — 5.62%; N — 7.56%
Found: C — 55.95%; H — 5.62%; N — 7.30%

EXAMPLE 33

Using a procedure analogous to that described in Example 20, the sodium salt of 1,2,3,4-tetrahydro-2-[indanyl-(1)-acetyl]-7-(N'-cyclohexyl-ureido-N-sulfonyl)-isoquinoline, m. p. 273°–276°C. (decomp.; from isopropanol/water), of the formula

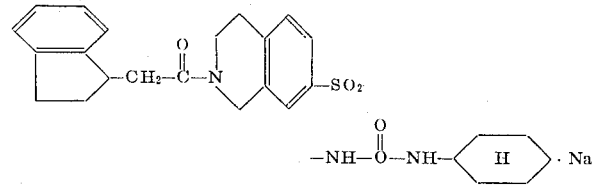

was prepared from 11.1 gm of 2-[indanyl-(1)-acetyl]-1,2,3,4-tetrahydro-isoquinoline-7-sulfonamide (m. p. 160°–165°C., decomp.) and 3.76 gm of cyclohexyl isocyanate. The yield was 6.4 gm.
Analysis: $C_{27} H_{32} N_3 O_4 S$ Na; mol. wt. 517.6
Calculated: C — 62.65%; H — 6.23%; N — 8.12%
Found: C — 63.00%; H — 6.04%; N — 8.35%

EXAMPLE 34

Using a procedure analogous to that described in Example 20, the sodium salt of 1,2,3,4-tetrahydro-2-(4'-methyl-3'-phenyl-valeroyl)-7-(N'-cyclohexyl-ureido-N-sulfonyl)-isoquinoline, m. p. 253°–259°C. (from ethanol), was prepared from 11.6 gm of 2-(4'-methyl-3'-phenyl-valeroyl)-1,2,3,4-tetrahydro-isoquinoline-7-sulfonamide (m. p. 164°–169°C.) and 3.7 gm of cyclohexyl isocyanate. The yield was 4.9 gm.
Analysis: $C_{28} H_{36} N_3 O_4 S$ Na; mol. wt. 533.7
Calculated: C — 63.02%; H — 6.80%; N — 7.87%
Found: C — 62.90%; H — 7.08%; N — 8.11%

EXAMPLE 35

Using a procedure analogous to that described in Example 20, the sodium salt of 1,2,3,4-tetrahydro-2-(2'-p-fluorophenyl-propionyl)-7-(N'-cyclohexyl-ureido-N-sulfonyl)-isoquinoline, m. p. 218°–223°C. (decomp.; from ethanol), was prepared from 3.99 gm of 2-(2'-p-fluorophenyl-propionyl)-1,2,3,4-tetrahydro-isoquinoline-7-sulfonamide (m. p. 165°–169°C.( and 1.52 gm of cyclohexyl isocyanate. The yield was 2.6 gm.
Analysis: $C_{25} H_{29} F N_3 O_4 S$ Na; mol. wt. 509.6
Calculated: C — 58.93%; H — 5.74%; N — 8.25%
Found: C — 58.60%; H — 6.05%; N — 8.40%

EXAMPLE 36

Using a procedure analogous to that described in Example 20, the colorless sodium salt of 1,2,3,4-tetrahydro-2-(3',4'-dichlorophenyl-propionyl)-7-(N'-cyclohexyl-ureido-N-sulfonyl)-isoquinoline, m. p. 238°–240°C. (decomp.; from methanol/benzene), was prepared from 4.8 gm of 2-(3',4'-dichlorophenyl-propionyl)-1,2,3,4-tetrahydro-isoquinoline-7-sulfonamide (m. p. 200°–202°C.) and 1.59 gm of cyclohexyl isocyanate. The yield was 2.47 gm.
Analysis: $C_{25} H_{28} Cl_2 N_3 O_4 S$ Na; mol. wt. 560.5
Calculated: C — 53.61%; H — 5.01%; N — 7.50%
Found: C — 53.60%; H — 5.13%; N — 7.43%

EXAMPLE 37

Using a procedure analogous to that described in Example 20, except that the reaction mixture was centrifuged after addition of cyclohexane and the separated solids were recrystallized right away from ethanol/methanol, the colorless sodium salt of 1,2,3,4-tetrahydro-2-(2'-p-tolyl-propionyl)-7-(N'-cyclohexyl-ureido-N-sulfonyl)-isoquinoline, m. p. 233°–235°C., was prepared from 8.1 gm of 2-(2'-p-tolyl-propionyl)-1,2,3,4-tetrahydro-isoquinoline-7-sulfonamide (m. p. 165°–168°C.) and 3.10 gm of cyclohexyl isocyanate. The yield was 6.5 gm.
Analysis: $C_{26} H_{32} N_3 O_4 S$ Na; mol. wt. 505.6
Calculated: C — 61.72%; H — 6.39%; N — 8.32%
Found: C — 61.70%; H — 6.65%; N — 8.57%

EXAMPLE 38

2-(2'-p-Trifluoromethylphenyl-propionyl)-1,2,3,4-tetrahydro-7-(N'-cyclohexyl-ureido-N-sulfonyl)-isoquinoline and its sodium salt 6.5 gm of viscous 2-(2'-p-trifluoromethylphenyl-propionyl)-1,2,3,4-tetrahydro-isoquinoline-7-sulfonamide were reacted with 2.17 gm of cyclohexylisocyanate, analogous to Example 20, and the precipitate was centrifuged off. The solid product obtained thereby was extracted with 2N hydrochloric acid and chloroform, the chloroform extract solution was evaporated, and the residue was purified by column-chromatography on silicagel (solvent system cyclohexane : acetone : glacial acetic acid = 10:5:0.1). 2.4 gm of foam-like 2-(2'-p-trifluoromethylphenyl-propionyl)-1,2,3,4-tetrahydro-7-(N'-cyclohexyl-ureido-N-sulfonyl)-isoquinoline were obtained, which were then converted into the sodium salt, m. p. 224°–227°C. (decomp.; from ethanol and a little benzene) as described in Example 20.
Analysis: $C_{26} H_{29} F_3 N_3 O_4 S$ Na; mol. wt. 559.6
Calculated: C — 55.85%; H — 5.23%; N — 7.52%

Found:C — 56.10%;H — 5.17%;N — 7.64%

EXAMPLE 39

2-(2'-p-Ethoxyphenyl-propionyl)-1,2,3,4-tetrahydro-7-(N'-cyclohexyl-ureido-N-sulfonyl)-isoquinoline and its sodium salt 13.5 gm of foamy 2-(2'-p-ethoxyphenyl-propionyl)-1,2,3,4-tetrahydro-isoquinoline-7-sulfonamide were reacted with 1.77 gm of cyclohexyl isocyanate analogous to Example 20. After completion of the reaction, three to four times the volume of absolute ether was added to the reaction solution, and the light yellow precipitate formed thereby was collected by vacuum filtration and recrystallized from ethanol in the presence of activated charcoal, yielding 6.0 gm of the raw sodium salt of 2-(2'-p-ethoxyphenyl-propionyl)-1,2,3,4-tetrahydro-7-(N'-cyclohexyl-ureido-N-sulfonyl)-isoquinoline, m. p. 220°–224°C. For purification, the raw salt was taken up in 2N HCl and chloroform, the chloroform phase was evaporated, and the residue (5.7 gm) was chromatographed as described in Example 38, yielding the colorless, foamy free 2-acyl-7-ureidosulfonyl-tetrahydroisoquinoline which was then again converted into its sodium salt, m. p. 224°–226°C. The yield of salt was 1.18 gm.

Analysis:$C_{27}$ $H_{34}$ $N_3$ $O_5$ S Na;mol. wt. 535.6
  Calculated:C — 60.55%;H — 6.40%;N — 7.85%
  Found:C — 60.75%;H — 6.50%;N — 7.80%

EXAMPLE 40

Using a procedure analogous to that described in Example 39, 1,2,3,4-tetrahydro-2-(2'-p-n-propoxyphenyl-propionyl)-7-(N'-cyclohexyl-ureido-N-sulfonyl)-isoquinoline, m. p. 122°–124°C. (from acetone/ether), was prepared from 13.5 gm of foamy 2-(2'-p-n-propoxyphenyl-propionyl)-1,2,3,4-tetrahydro-isoquinoline-7-sulfonamide and 4.62 gm of cyclohexyl isocyanate.

Analysis:$C_{28}$ $H_{37}$ $N_3$ $O_5$ S;mol. wt. 527.6
  Calculated:C — 63.65%;H — 7.08%;N — 7.96%
  Found:C — 63.45%;H — 6.88%;N — 8.01%

Its sodium salt had a melting point of 232°–234°C.

Analysis:$C_{28}$ $H_{36}$ $N_3$ $O_5$ S Na;mol. wt. 549.6
  Calculated:C — 61.20%;H — 6.61%;N — 7.65%
  Found:C — 61.25%;H — 6.78%;N — 7.88%

EXAMPLE 41

Using a procedure analogous to that described in Example 39, the sodium salt of 1,2,3,4-tetrahydro-2-(2'-p-diphenyl-propionyl)-7-(N'-cyclohexyl-ureido-N-sulfonyl)-isoquinoline, m. p. 245°–250°C. (decomp.), was prepared from 6.6 gm of 2-(2'-p-diphenyl)-1,2,3,4-tetrahydro-isoquinoline-7-sulfonamide (m. p. 188°–192°C.) and 2.16 gm of cyclohexyl isocyanate. The yield was 1.5 gm.

Analysis:$C_{31}$ $H_{34}$ $N_3$ $O_4$ S Na;mol. wt. 567.7
  Calculated:C — 65.57%;H — 6.04%;N — 7.41%
  Found:C — 65.30%;H — 6.16%;N — 7.50%

EXAMPLE 42

Using a procedure analogous to that described in Example 37, the colorless sodium salt of 1,2,3,4-tetrahydro-2-[2'-(α-napthyl)-propionyl]-7-(N'-cyclohexyl-ureido-N-sulfonyl)-isoquinoline, m. p, 263°–265°C. (decomp.; from ethanol/benzene), was prepared from 2.65 gm of 2-[2'-(α-naphthyl)-propionyl]-1,2,3,4-tetrahydro-isoquinoline-7-sulfonamide (m. p. 203°–207°C.) and 0.93 gm of cyclohexyl isocyanate. The yield was 0.65 gm.

Analysis:$C_{29}$ $H_{32}$ $N_3$ $O_4$ S Na;mol. wt. 541.6
  Calculated:C — 64.31%;H — 5.95%;N — 7.76%
  Found:C — 64.20%;H — 6.02%;N — 7.90%

EXAMPLE 43

2,3,4,5-Tetrahydro-3-(2'-p-bromophenyl-propionyl)-7-(N'-cyclohexyl-ureido-N-sulfonyl)-1H-3-benzazepine 8.7 gm of foamy 3-(2'-p-bromophenyl-propionyl)-2,3,4,5-tetrahydro-1H-3-benzazepine-7-sulfonamide and 2.74 gm of cyclohexyl isocyanate were reacted analogous to Example 20. After completion of the reaction, absolute ether was added to the reaction solution, and the yellowish precipitate formed thereby was taken up in 2N HCl and chloroform. The chloroform phase was evaporated, the residue was purified by column-chromatography on silicagel (solvent system cyclohexane : acetone : glacial acetic acid = 30:10:0.2) and the colorless, foamy product was crystallized by triturating it with acetone/methyl ethyl ketone, yielding 2,3,4,5-tetrahydro-3-(2'-p-bromophenyl-propionyl)-7-(N'-cyclohexyl-ureido-N-sulfonyl)-1H-3-benzazeine, m. p. 208°–210°C. (decomp.), of the formula

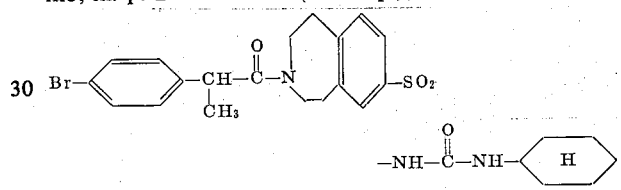

Analysis: $C_{26}$ $H_{32}$ Br $N_3$ $O_4$ S; mol. wt. 562.5
  Calculated: C — 55.55%; H — 5.74%; N — 7.48%
  Found: C — 55.50%; H — 5.63%; N — 7.38%

EXAMPLE 44

Using a procedure analogous to that described in Example 43, crystalline 2,3,4,5-tetrahydro-3-(2'-p-chlorophenyl-propionyl)-7-(N'-cyclohexyl-ureido-N-sulfonyl)-1H-3-benzazepine, m. p. 205°–207°C., was prepared from 1.8 gm of foamy 3-(2'-p-chlorophenyl-propionyl)-2,3,4,5-tetrahydro-1H-3-benzazepine-7-sulfonamide and 0.63 gm of cyclohexyl isocyanate.

Analysis: $C_{26}$ $H_{32}$ Cl $N_3$ $O_4$ S; mol. wt. 518.1
  Calculated: C — 60.27%; H — 6.23%; N — 8.11%
  Found: C — 60.10%; H — 6.16%; N — 7.93%

EXAMPLE 45

Preparation of 1,2,3,4-tetrahydro-2-(3'-phenyl-propionyl)-7-[N'-(4-methylcyclohexyl)-ureido-N-sulfonyl]-isoquinoline by Method B A mixture consisting of 4.0 gm (9.6 millimols) of N-[2-(3'-phenyl-propionyl)-1,2,3,4-tetrahydro-isoquinoline-7-sulfonyl]-carbamic acid ethyl ester (m. p. 138°–141°C.), 1.02 gm (10.2 millimols) of 4-methyl-cyclohexyl-amine (about 25 percent cis- and about 75 percent trans-isomeric) and 5 ml of dimethylformamide (freshly distilled over $P_2O_5$) was heated for one hour at 100°C. and then for 30 minutes at 120°C. Thereafter, the solution was evaporated in vacuo, the residue was taken up in 1N hydrochloric acid, and the insoluble matter was collected by vacuum filtration, air-dried and recrystallized from ethylacetate. 1.5 gm of 1,2,3,4-tetrahydro-2-(3'-phenyl-propionyl)-7-[N'-

(4-methyl-cyclohexyl)-ureido-N-sulfonyl]-isoquinoline, m. p. 155°–158°C., of the formula

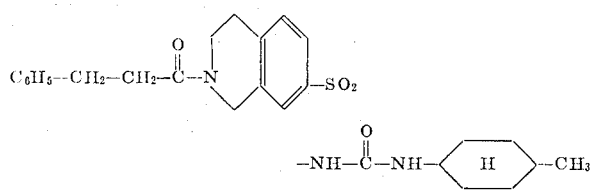

were obtained.

Analysis: $C_{26}H_{33}N_3O_4S$; mol. wt. 483.7
 Calculated: C — 64.58%; H — 6.88%; N — 8.69%
 Found: C — 64.70%; H — 6.92%; N — 8.79%

EXAMPLE 46

Sodium salt of 2-(3'-phenyl-propionyl)-1,2,3,4-tetrahydro-7-(N'-cycloheptyl-ureido-N-sulfonyl)-isoquinoline A mixture consisting of 4.17 gm (10 millimols) of N-[2-(3'-phenyl-propionyl)-1,2,3,4-tetrahydro-isoquinoline-7-sulfonyl]-carbamic acid ethyl ester (m. p. 138°–141°C.), 1.25 gm (11 millimols) of cycloheptylamine and 5 ml of anhydrous dimethylformamide was heated for 1 hour at 100°C. and then for 30 minutes at 130°C. Thereafter, the reaction solution was evaporated in vacuo, the residue was taken up in hot ethanol in the presence of activated charcoal, the mixture was filtered, the filtrate was admixed with a solution of one equivalent of sodium hydroxide in the minimum required amount of water, and the mixed solution was cooled. 3.3 gm of the sodium salt of 2-(3'-phenyl-propionyl)-1,2,3,4-tetrahydro-7-(N'cycloheptyl-ureido-N-sulfonyl)-isoquinoline, m. p. 268°–270°C. (decomp.), crystallized out.

Analysis: $C_{26}H_{32}N_3O_4SNa$; mol. wt. 505.6
 Calculated: C — 61.72%; H — 6.38%; N — 8.30%
 Found: C — 61.80%; H — 6.59%; N — 8.10%

EXAMPLE 47

Using a procedure analogous to that described in Example 46, 3.8 gm of the sodium salt of 2-(3'-phenyl-propionyl)-1,2,3,4-tetrahydro-7-(N'-cyclooctyl-ureido-N-sulfonyl)-isoquinoline, m. p. 270°–275°C. (from ethanol), were obtained from 4.17 gm of N-[2-(3'-phenyl-propionyl)-1,2,3,4-tetrahydro-isoquinoline-7-sulfonyl]-carbamic acid ethyl ester (m. p. 138°–141 °C.) and 1.40 gm of cyclooctylamine.

Analysis: $C_{27}H_{34}N_3O_4SNa$; mol. wt. 519.7
 Calculated: C — 62.41%; H — 6.60%; N — 8.09%
 Found: C — 62.10%; H — 6.45%; N — 7.89%

EXAMPLE 48

Using a procedure analogous to that described in Example 46, 3.0 gm of the sodium salt of 2-(3'-phenyl-propionyl)-1,2,3,4-tetrahydro-7-(N'-cyclopentyl-ureido-N-sulfonyl)-isoquinoline, m. p. 260°–262°C. (decomp.; from ethanol), were obtained from 4.17 gm of N-[2-(3'-phenyl-propionyl)-1,2,3,4-tetrahydro-isoquinoline-7-sulfonyl]-carbamic acid ethyl ester (m. p. 138°–141°C.) and 1.40 gm of cyclopentylamine.

Analysis: $C_{24}H_{28}N_3O_4SNa$; mol. wt. 477.6
 Calculated: C — 60.36%; H — 5.91%; N — 8.80%
 Found: C — 60.30%; H — 5.99%; N — 8.84%

EXAMPLE 49

Using a procedure analogous to that described in Example 46, 1.3 gm of the sodium salt of 2-(2'-phenyl-propionyl)-1,2,3,4-tetrahydro-7-(N'-4-methyl-cyclohexyl-ureido-N-sulfonyl)-isoquinoline, m. p. 227°–228°C. (from ethanol), were obtained from 4.00 gm of N-[2-(2'-phenyl-propionyl)-1,2,3,4-tetrahydro-isoquinoline-7-sulfonyl]-carbamic acid ethyl ester and 1.02 gm of 4-methyl-cyclohexylamine.

Analysis: $C_{26}H_{32}N_3O_4SNa$; mol. wt. 505.6
 Calculated: C — 61.76%; H — 6.38%; N — 8.31%
 Found: C — 61.60%; H — 6.60%; N — 8.10%

EXAMPLE 50

Using a procedure analogous to that described in Example 46, 0.8 gm of the sodium salt of 2-(2'-phenyl-propionyl)-1,2,3,4-tetrahydro-7-[N'-adamantyl-(1)-ureido-N-sulfonyl]-isoquinoline, m. p. 225°–229°C. (from ethanol), were obtained from 5.05 gm of N-[2-(2'-phenyl-propionyl)-1,2,3,4-tetrahydro-isoquinoline-7-sulfonyl]-carbamic acid ethyl ester and 2.50 gm of adamantyl-(1)-amine hydrochloride and 1.35 g of triethylamine.

Analysis: $C_{29}H_{34}N_3O_4SNa$; mol. wt. 543.7
 Calculated: C — 3064.07%; H — 6.30%; N — 7.73%
 Found: C — 63.80%; H — 6.30%; N — 7.58%

EXAMPLE 51

Using a procedure analogous to that described in Example 46, 3.5 gm of the sodium salt of 2-(3'-phenyl-butyryl)-1,2,3,4-tetrahydro-7-[N'-(p-methyl-cyclohexyl)-ureido-N-sulfonyl]-isoquinoline, m. p. 270°–275°C. (decomp.; from ethanol), were obtained from 4.5 gm of N-[2-(3'-phenyl-butyryl)-1,2,3,4-tetrahydro-isoquinoline-7-sulfonyl]-carbamic acid ethyl ester (m. p. 105°–108°C.) and 1.3 gm of 4-methyl-cyclohexylamine.

Analysis: $C_{27}H_{34}N_3O_4SNa$; mol. wt. 519.7
 Calculated: C — 62.41%; H — 6.59%; N — 8.09%
 Found: C — 62.10%; H — 6.90%; N — 8.04%

EXAMPLE 52

Using a procedure analogous to that described in Example 46, 2.05 gm of the sodium salt of 2-(3'-phenyl-butyryl)-1,2,3,4-tetrahydro-7-[N'-adamantyl-(1)-ureido-N-sulfonyl]-isoquinoline, m. p. 263°–265°C. (decomp.; from ethanol), were obtained from 4.5 gm of N-[2-(3'-phenyl-butyryl)-1,2,3,4-tetrahydro-isoquinoline-7-sulfonyl]-carbamic acid ethyl ester (m. p. 105°–108°C.) and 1.74 gm of adamantyl-(1)-amine.

Analysis: $C_{30}H_{36}N_3O_4SNa$; mol. wt. 557.7
 Calculated: C — 64.62%; H — 6.51%; N — 7.54%
 Found: C — 64.30%; H — 6.83%; N — 7.56%

EXAMPLE 53

Using a procedure analogous to that described in Example 46, 0.8 gm of the sodium salt of 2-(2'-p-chlorophenyl-propionyl)-1,2,3,4-tetrahydro-7-(N'-cyclohexyl-ureido-N-sulfonyl)-isoquinoline, m. p. 228°–230°C. (decomp.), were obtained from 4.51 gm of glass-like N-[2-(2'-p-chlorophenyl-propionyl)-1,2,3,4-tetrahydro-isoquinoline-7-sulfonyl]-carbamic acid ethyl ester and 1.10 gm of cyclohexylamine.

EXAMPLE 54

2-(2'-p-Chlorophenyl-propionyl)-1,2,3,4-tetrahydro-7-(N'-cyclohexyl-ureido-N-sulfonyl)-isoquinoline A solution of 4.23 gm (11.2 millimols) of 2-(2'-p- chlorophenyl-propionyl)-1,2,3,4-tetrahydro-isoquinoline-7-sulfonamide (m. p. 147°–150°C.) and 1.26 gm (11.2 millimols) of potassium tert.butylate in 30 ml of anhydrous dimethylformamide was added dropwise at 0° to +5°C. to 1.50 gm (11.2 millimols) of cyclohexyl isocyanate. Thereafter, the mixture was stirred for 2 hours at 0° to +5°C. and then filtered, and the filtrate was acidified with 2N HCl. The greasy precipitate formed thereby was collected by vacuum filtration and dissolved in ethylacetate, and the resulting solution was washed with water, dried over sodium sulfate and evaporated. The residue was purified by column-chromatography on silicagel (solvent system cyclohexane : acetone : glacial acetic acid = 40:20:0.4) and recrystallization from a mixture of ethylacetate and ether (2:1). 3.4 gm of colorless 2-(2'-p-chlorophenyl-propionyl)-1,2,3,4-tetrahydro-7-(N'-cyclohexyl-ureido-N-sulfonyl)-isoquinoline, m. p. 110°–115°C., were obtained.

Analysis: $C_{25} H_{30} Cl N_3 O_4 S$; mol. wt. 504.0

Calculated: C — 59.60%; H — 6.00%; N — 8.34%
Found: C — 59.40%; H — 6.17%; N — 8.44%

One gm (1.985 millimols) of the 2-acyl-7-ureido-sulfonyl-tetrahydroisoquinoline thus obtained was dissolved in 2 ml of absolute ethanol, and 1.985 ml of 1N sodium hydroxide were added. The mixture was evaporated to dryness, and the residue was caused to crystallize by treating it with a mixture of benzene and acetone. The colorless crystalline product was collected by vacuum filtration, washed with ethanol, acetone and ether, and dried at 70°C. in a vacuum of 0.1 mm Hg, yielding 1.0 gm of the sodium salt of 2-(2'-p-chlorophenyl-propionyl)-1,2,3,4-tetrahydro-7-(N'-cyclohexyl-ureido-N-sulfonyl)-isoquinoline, m. p. 227°–231°C. (decomp.).

Analysis: $C_{25} H_{29} Cl N_3 O_4 S Na$; mol. wt. 526.1

Calculated: C — 57.10%; H — 5.56 %; N — 7.99%
Found: C — 57.20%; H — 5.62%; N — 7.97%

EXAMPLE 55

Using a procedure analogous to that described in Example 54, the colorless sodium salt of 1,2,3,4-tetrahydro-2-(2'-p-bromophenyl-propionyl)-7-(N'-cyclohexyl-ureido-N-sulfonyl)-isoquinoline, m. p. 222°–225°C., was prepared from 5.20 gm of 2-(2'-p-bromophenyl-propionyl)-1,2,3,4-tetrahydro-isoquinoline-7-sulfonamide, (m. p. 146°–148°C.) and 3.70 gm of cyclohexyl isocyanate. The yield was 1.68 gm.

Analysis: $C_{25} H_{29} Br N_3 O_4 S Na$; mol. wt. 570.5

Calculated: C — 52.63%; H — 5.12%; N — 7.37%
Found: C — 52.40%; H — 5.24%; N — 7.28%

The free 2-acyl-7-ureidosulfonyl-tetrahydroisoquinoline had a melting point of 109°–112°C.

The compounds according to the present invention, i.e. those embraced by formula I above and their alkali metal or alkaline earth metal salts, have useful pharmacodynamic properties. More particularly, the compounds of the instant invention exhibit very effective hypoglycemic activities at relatively low dosage levels, coupled with low toxicity. (tested on rats according to the method of U.Harding, G.Heinzel, Zeitschrift f.klin. Chem.u.Biochem. 7, 640–643 (1969)).

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.0166 to 0.33 mgm/kg, preferably 0.083 mgm/kg body weight.

The following examples illustrate a few hypoglycemic dosage unit compositions comprising a compound of the present invention as an active ingredient and represent the best modes contemplated of putting the invention into practical use. The parts are parts by weight unless otherwise specified.

EXAMPLE 56

Tablets

The tablet composition was compounded from the following ingredients:

| | |
|---|---|
| Sodium salt of 1,2,3,4-tetrahydro-2-(2'-p-bromophenyl-propionyl)-7-(N'-cyclohexyl-ureido-N-sulfonyl)-isoquinoline | 5.0 parts |
| Lactose | 85.0 parts |
| Corn starch | 26.0 parts |
| Polyvinylpyrrolidone | 3.0 parts |
| Magnesium stearate | 1.0 parts |
| Total | 120.0 parts |

Preparation:

The isoquinoline compound was intimately admixed with the lactose and the corn starch, the mixture was uniformly moistened with an ethanolic 12.5 percent solution of the polyvinylpyrrolidone, the moist mass was forced through a 1.5 mm-mesh screen, the resulting moist granulate was dried at 45°C., again passed through a 1.0 mm-mesh screen and then admixed with the magnesium stearate. The finished composition was compressed into 120 mgm-tablets in a conventional tablet-making machine. Each tablet contained 5.0 mgm of the isoquinoline compound and, when administered perorally to a warm-blooded animal of about 60 kg body weight in need of such treatment, produced a very effective hypoglycemic action.

EXAMPLE 57

Gelatin Capsules

The capsule filler composition was compounded from the following ingredients:

| | |
|---|---|
| Sodium salt of 1,2,3,4-tetrahydro-2-(2'-p-bromophenyl-propionyl)-7-(N'-cyclohexyl-ureido-N-sulfonyl)-isoquinoline | 5.0 parts |
| Corn starch, dry | 95.0 parts |
| Total | 100.0 parts |

Preparation:

The ingredients were intimately admixed with each other, the mixture was passed through a 0.75 mm-mesh screen, and 100 mgm-portions of the screened mixture were filled into hard gelatin capsules of suitable size. Each capsule contained 5.0 mgm of the isoquinoline compound and, when administered perorally to a warm-blooded animal of about 60 kg body weight in need of such treatment, produced a very effective hypoglycemic action.

Analogous results were obtained when any one of the other compounds embraced by formula I or an alkali metal or alkaline earth metal salt thereof was substituted for the particular isoquinoline compound in Examples 56 and 57, especially the following:

1,2,3,4-Tetrahydro-2-(2'-p-chlorophenyl-propionyl)-7-(N'-cyclohexyl-ureido-N-sulfonyl)-isoquinoline;

Sodium salt of 1,2,3,4-tetrahydro-2-(2'-p-tolyl-propionyl)-7-(N'-cyclohexyl-ureido-N-sulfonyl)-isoquinoline;

Sodium salt of 1,2,3,4-tetrahydro-2-[2'-(3'',4''-dichlorophenyl)-propionyl]-7-(N'cyclohexyl-ureido-N-sulfonyl)-isoquinoline;

Sodium salt of 1,2,3,4-tetrahydro-2-(2'-p-trifluoromethyl-phenyl-propionyl)-7-(N'-cyclohexyl-ureido-N-sulfonyl)-isoquinoline; or 2,3,4,5-Tetrahydro-3-(2'-p-bromophenyl-propionyl)-7-(N'-cyclohexyl-ureido-N-sulfonyl)-1H-3-benzazepine.

Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

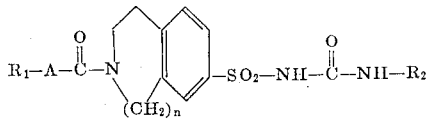

wherein $R_1$ is phenyl, alkoxy of one to three carbon atoms — phenyl, tolyl, trifluoromethyl-phenyl, monohalo-phenyl, dihalo-phenyl, 2-methoxy-5-chloro-phenyl, diphenyl, α-naphthyl, 1,2,3,4-tetrahydro-napthyl-(1), indanyl-(1) or benzoyl, $R_2$ is n-butyl, cycloalkyl of five to eight carbon atoms, alkyl of one to two carbon atoms — cycloalkyl of five to eight carbon atoms, or adamantyl-(1), A is a carbon-to-carbon bond, straight or branched alkylene of one to five carbon atoms or monophenyl-(alkylene of one to four carbon atoms), and $n$ is 1 or 2, a non-toxic alkali metal salt thereof, or a non-toxic alkaline earth metal salt thereof.

2. A compound according to claim 1, which is 1,2,3,4-tetrahydro-2-(2'-p-chlorophenyl-propionyl)-7-(N'-cyclohexyl-ureido-N-sulfonyl)-isoquinoline or the sodium salt thereof.

3. A compound according to claim 1, which is 1,2,3,4-tetrahydro-2-(2'-p-tolyl-propionyl)-7-(N'-cyclo-hexyl-ureido-N-sulfonyl)-isoquinoline or the sodium salt thereof.

4. A compound according to claim 1, which is 1,2,3,4-tetrahydro-2-[2'-(3'',4''-dichlorophenyl)-propionyl]-7-(N'-cyclohexyl-ureido-N-sulfonyl)-isoquinoline or the sodium salt thereof.

5. A compound according to claim 1, which is 1,2,3,4-tetrahydro-2-(2'-p-trifluoromethyl-phenyl-propionyl)-7-(N'-cyclohexyl-ureido-N-sulfonyl)-isoquinoline or the sodium salt thereof.

6. A compound according to claim 1, which is 2,3,4,5-tetrahydro-3-(2'-p-bromophenyl-propionyl)-7-(N'-cyclohexyl-ureido-N-sulfonyl)-1H-3-benzazepine or the sodium salt thereof.

7. A compound according to claim 1, which is 1,2,3,4-tetrahydro-2-(2'-p-bromophenyl-propionyl)-7-(N'-cyclohexyl-ureido-N-sulfonyl)-isoquinoline or the sodium salt thereof.

8. A compound according to claim 1, which is 1,2,3,4-tetrahydro-2-(2'-phenyl-propionyl)-7-(N-cyclohexyl-ureido-N-sulfonyl)-isoquinoline or the sodium salt thereof.

* * * * *

UNITED STATES PATENT OFFICE
CERTIFICATE OF CORRECTION

Patent No. 3,725,388  Dated April 3, 1973

Inventor(s) Wolfgang Grell et al.

It is certified that error appears in the above-identified patent and that said Letters Patent are hereby corrected as shown below:

Insert -- [30] Foreign Application Priority Data

July 1, 1969  Germany  P 19 33 388.1

June 4, 1970  Germany  P 20 27 436.6 --.

Column 2, line 54 "R" should read -- $R_1$ --. Column 3, line 26, "%;N" should read -- 2, --; same column 3, Formula (XII) should appear as shown below:

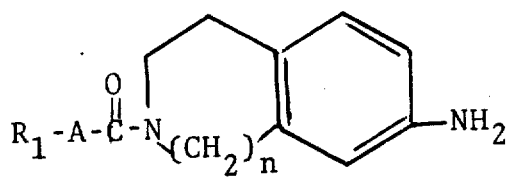

Column 5, line 67, "8.14%" should read -- 8.13% --. Column 6, line 64, "phenyl-propionyl)-" should read -- was then --. Column 22, line 22, after "3'" insert -- -trifluoromethyl-benzoyl)- --; line 59, "c'" should read -- 3' --. Column 23, line 44, in the formula

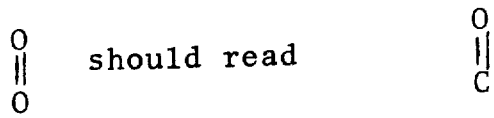

Column 25, line 53, after "diphenyl" insert ---propionyl --.
Column 28, line 23, cancel "30" after "C -".

Signed and sealed this 9th day of July 1974.

(SEAL)
Attest:

McCOY M. GIBSON, JR.
Attesting Officer

C. MARSHALL DANN
Commissioner of Patents